US007437390B2

(12) United States Patent
Sasaki et al.

(10) Patent No.: US 7,437,390 B2
(45) Date of Patent: Oct. 14, 2008

(54) INFORMATION RECORDING MEDIUM, INFORMATION RECORDING METHOD, INFORMATION RECORDING APPARATUS, INFORMATION REPRODUCING METHOD AND INFORMATION REPRODUCING APPARATUS

(75) Inventors: Miyuki Sasaki, Osaka (JP); Yoshiho Goto, Osaka (JP); Yoshihisa Fukushima, Osaka (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 371 days.

(21) Appl. No.: 11/379,636

(22) Filed: Apr. 21, 2006

(65) Prior Publication Data

US 2006/0190508 A1 Aug. 24, 2006

Related U.S. Application Data

(63) Continuation of application No. 09/870,405, filed on May 30, 2001, now Pat. No. 7,130,840.

(30) Foreign Application Priority Data

May 31, 2000 (JP) ............................. 2000-163829
Aug. 30, 2000 (JP) ............................. 2000-261971

(51) Int. Cl.
 G06F 17/30 (2006.01)
(52) U.S. Cl. .................................................... 707/205
(58) Field of Classification Search .................... 707/3, 707/5, 205; 709/224
See application file for complete search history.

(56) References Cited

U.S. PATENT DOCUMENTS

| 4,922,415 | A | 5/1990 | Hemdal ....................... 711/206 |
| 5,210,734 | A | 5/1993 | Sakurai ........................ 369/49 |
| 5,293,566 | A | 3/1994 | Satoh et al. ................... 369/49 |
| 6,366,907 | B1 | 4/2002 | Fanning et al. ................. 707/3 |
| 6,681,239 | B1 | 1/2004 | Munroe et al. ............... 718/104 |

FOREIGN PATENT DOCUMENTS

EP 0 507 397 10/1992

(Continued)

OTHER PUBLICATIONS

"Universal Disk Format Specification Revision 2.01," Optical Storage Technology Association dated Mar. 15, 2000, pp. 33-36.

(Continued)

*Primary Examiner*—Etienne P LeRoux
(74) *Attorney, Agent, or Firm*—Renner, Otto, Boisselle & Sklar, LLP

(57) ABSTRACT

An information recording medium comprises a data recording area. A lead-in area and a volume space are allocated in the data recording area in advance. The volume space is constructed so as to allow a logical zone for recording at least a volume-file structure and an over-run protection area for preventing an access to an unrecorded area to be alternately allocated in the volume space. The lead-in area and the over-run protection area each include a chain volume management information area for storing chain volume management information. The chain volume management information includes address information of a subsequent logical zone and address information of a subsequent chain volume management information area.

6 Claims, 19 Drawing Sheets

FOREIGN PATENT DOCUMENTS

| | | |
|---|---|---|
| EP | 0 510 834 | 10/1992 |
| EP | 0 540 164 | 5/1993 |
| EP | 0 730 274 | 9/1996 |
| EP | 0 938 092 | 8/1999 |
| JP | 2000-215644 | 8/2000 |
| WO | 00/05717 | 2/2000 |
| WO | 00/19432 | 4/2000 |
| WO | 00/30106 | 5/2000 |
| WO | 00 54158 | 9/2000 |

OTHER PUBLICATIONS

Commonly Owned Copending Sibling Application entitled "Information Recording Medium, Information Recording Method, Information Recording Apparatus, Information Reproducing Method, and Information Reproducing Apparatus", filed Apr. 21, 2006 claims attached.

| Field name | Content |
|---|---|
| VAT header | Logical volume identifier etc. |
| Basic structure information | VAT entry 0 (Logical address of file set descriptor) |
| | VAT entry 1 (Logical address of root directory FE) |
| Specific application structure information | VAT entry 2 (unused: FFFFFFFFh) |
| | VAT entry 255 (unused: FFFFFFFFh) |
| General-purpose application structure information | VAT entry 256 (unused: FFFFFFFFh) |
| | VAT entry 473 (unused: FFFFFFFFh) |

(b) 169

| Field name | Content |
|---|---|
| VAT header | Logical volume identifier etc. |
| Basic structure information | VAT entry 0 (Logical address of file set descriptor) |
| | VAT entry 1 (Logical address of root directory FE) |
| Specific application structure information | VAT entry 2 (Logical address of directory (AV-Dir) FE) |
| | VAT entry 3 (Logical address of AVfile FE) |
| | VAT entry 4 (unused: FFFFFFFFh) |
| | VAT entry 255 (unused: FFFFFFFFh) |
| General-purpose application structure information | VAT entry 256 (unused: FFFFFFFFh) |
| | VAT entry 473 (unused: FFFFFFFFh) |

(c) 175

| Field name | Content |
|---|---|
| VAT header | Logical volume identifier etc. |
| Basic structure information | VAT entry 0 (Logical address of file set descriptor) |
| | VAT entry 1 (Logical address of root directory FE) |
| Specific application structure information | VAT entry 2 (Logical address of directory (AV-Dir) FE) |
| | VAT entry 3 (Logical address of AVfile FE) |
| | VAT entry 4 (unused: FFFFFFFFh) |
| | VAT entry 255 (unused: FFFFFFFFh) |
| General-purpose application structure information | VAT entry 256 (Logical address of directory (Data-Dir) FE) |
| | VAT entry 257 (Logical address of Datafile FE) |
| | VAT entry 258 (unused: FFFFFFFFh) |
| | VAT entry 473 (unused: FFFFFFFFh) |

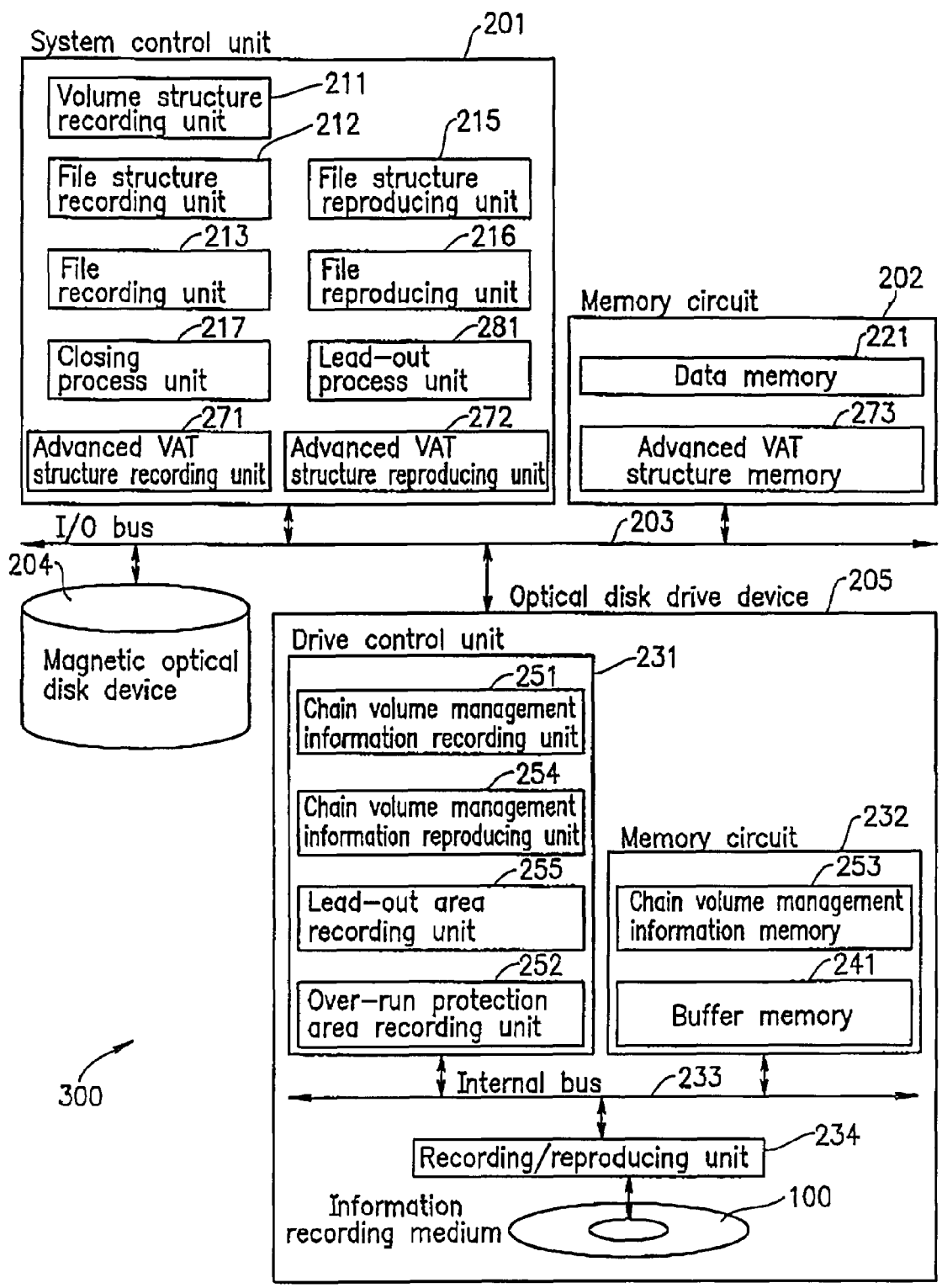

INFORMATION RECORDING MEDIUM, INFORMATION RECORDING METHOD, INFORMATION RECORDING APPARATUS, INFORMATION REPRODUCING METHOD AND INFORMATION REPRODUCING APPARATUS

This is a continuation of U.S. application Ser. No. 09/870,405 filed May 30, 2001 now U.S. Pat. No. 7,130,840.

BACKGROUND OF THE INVENTION

1. Field of the Invention

The present invention relates to an information recording medium, and a method and an apparatus for recording information into the medium. The present invention also relates to a method and an apparatus for reproducing information recorded in the information recording medium. More particularly, the present invention relates to an information recording medium in which a lead-in area and an over-run protection area, both including an area which records chain volume management information for obtaining the end position of an accessible area, and which has a file structure in which a specific virtual address is assigned to a specific file structure, and a method and an apparatus for recording information into the information recording medium.

2. Description of the Related Art

Recently, various types of media have been used for recording digital data. Among other things, a DVD-R disk is becoming the focus of attention as an inexpensive optical disk having a large capacity. The writing or reading operation of the DVD-R disk will be described below with reference to FIGS. 13 through 18. In the following description, a descriptor, a pointer, and the like, which are recorded as volume file structure, are in conformity with ISO/IEC 13346 standards or universal disk format (UDF) standards unless otherwise specified.

In brief, the description is as follows. Initially, a data structure diagram of an information recording medium shown in FIG. 13 and a block structure diagram of an information recording/reproducing apparatus shown in FIG. 15 will be described.

Next, a data structure diagram of the information recording medium after a closing process shown in FIG. 18 will be described with reference to a flowchart of a closing process shown in FIG. 17.

Finally, the operation of the information recording/reproducing apparatus when reproducing a file will be described with reference to FIG. 15 and a flowchart of a reproduction process in the information recording/reproducing apparatus shown in FIG. 19.

In FIG. 13, a conventional information recording medium 1300 is shown. The information recording medium 1300 is, for example, one which is in conformity with DVD-R physical standards (version 1.0). For example, a file is recorded in the information recording medium 1300 using a volume file structure in conformity with DVD-R file system standards (version 1.0).

FIG. 14 shows a directory structure. A file recorded in the information recording medium 1300 are managed in accordance with the directory structure of FIG. 14.

In FIG. 13, a lead-in area 108 including a physical format information area 1332 is provided at the head of a data recording area in the information recording medium 1300. Following the lead-in area 108, a volume space 104 is provided.

In a formatting process, in the volume space 104, a volume structure area 118, a file structure/file area 120, and a virtual allocation table (VAT) structure area 1322 are created. A volume structure area 118 which stores a volume structure is provided at the head of the volume space 104.

Further, upon recording an AVfile which is managed in accordance with the directory structure of FIG. 14, a file structure/file area 124 and a VAT structure area 1326 are created.

Next, in a closing process which enables the information reproducing apparatus incapable of detecting a position in an unrecorded area to search the current volume file structure while prohibiting access to an unrecorded area, a border-out area 1310 and a physical format information area 1332 are created in a data recording area 102. The border-out area 1310 includes a state determination area 1334. The physical format information area 1332 is provided in the lead-in area 108 which is unrecorded after the formatting process. The details of the conventional closing process procedure will be described later.

Further, upon recording a Datafile, which is managed in accordance with the directory structure of FIG. 14, a file structure/file area 128 and a VAT structure area 1330 are created in the volume space 104.

Finally, by executing the closing process again, a border-out area 1312, a state determination area 1334, and a border-in area 1311 are created in the volume space 104. The border-out area 1312 includes a state determination area 1336 which is unrecorded. The state determination area 1334 provided in the border-out area 1310 and the border-in area 1311 including a physical format information area 1335 are recorded in the volume space 104.

Every time the closing process is executed, a logical zone, in which a volume file structure and a file are recorded, is created in the volume space 104. In the volume space 104, the logical zone is positioned between the lead-in area 108 or a border-in area and a border-out area.

A detailed data structure of physical format information will be described below with reference to FIG. 13. The physical format information includes the address information of a logical zone, the address information of a border-out area, and the address information of a border-in area which are used to manage such a zone and areas provided in the information recording medium 1300.

Since the border-in area 1311 is created from the head of an unrecorded area 138, the physical format information recorded in the physical format information area 1335 includes the address information of the unrecorded area 138 as the address information of the border-in area 1311.

Further, the address information of a border-out area included in the physical format information and the address information of an unrecorded area are utilized so as to prevent a reproduction-only apparatus incapable of detecting a position in a data unrecorded area from detecting a position in the data unrecorded area and erroneously accessing the unrecorded area. The address information of a logical zone is utilized so as to search the latest VAT structure created at the end of the logical zone.

VATs 1363, 1369, and 1375 and VATICBs 164, 170, and 176 which are recorded in the VAT structure areas 1322, 1326, or 1330, respectively, each have a data structure in conformity with the UDF standards. With such a data structure, updating a file structure may be simplified in a write-once recording medium. A recording position of a file structure, such as a file entry, is pointed to by a virtual address in a virtual address space. A recording position on a disk is pointed to by a logical address in a logical address space. A correspondence between such a logical address and such a virtual address is stored in a VAT. A recording position for a VAT is pointed to by a VAT- ICB provided at the end sector of an area in which data is recorded. A virtual address registered in a VAT is typically provided in each file management information in ascending order of registration to the VAT.

FIG. 15 is a block diagram illustrating a conventional information recording/reproducing apparatus 1500. The information recording/reproducing apparatus 1500 includes a system control unit 201, a memory circuit 202, an I/O bus 203, a magnetic optical disk device 204, and an optical disk drive device 205.

The system control unit 201 is realized using a microprocessor including a system control program and a memory. Specifically, the system control unit 201 includes a volume structure recording unit 211 for recording a volume structure, a volume structure reproducing unit 214 for reproducing a volume structure, a file structure recording unit 212 for recording a file structure, a file structure reproducing unit 215 for reproducing a file structure, a file recording unit 213 for recording file data, a file reproducing unit 216 for reproducing file data, a closing process unit 217 for instructing execution of a closing process, a VAT structure recording unit 281 for recording a VAT structure, and a VAT structure reproducing unit 282 for reproducing a VAT structure.

The memory circuit 202 includes a data memory 221 for operating or temporarily storing a volume structure, a file structure and a file, and a VAT structure memory 283 for operating or temporarily storing a VAT structure.

The optical disk drive device 205 includes a drive control unit 231, a memory circuit 232, an internal bus 233, a recording/reproducing unit 234, and an information recording medium 1300.

The drive control unit 231 is realized using a microprocessor including a drive control program and a memory. Specifically, the drive control unit 231 includes a border-out area recording unit 261, a physical format information reproducing unit 262, a physical format information recording unit 263, a state determination area recording unit 264, a border-in area recording unit 265, and a state determination area reproducing unit 267.

The memory circuit 232 includes a physical format information memory 266 used in operating or temporarily storing physical format information and a buffer memory 241 used in operating or temporarily storing data transferred to the optical disk drive device 205.

A closing process for a DVD-R disk will be described with reference to FIGS. 13, 15, 16, 17, and 18.

FIG. 16 is a data structure diagram of the information recording medium 1300 after a formatting process. FIG. 17 is a flowchart showing the closing process. FIG. 18 is a data structure diagram of the information recording medium 1300 after a closing process.

(S1701) The system control unit 201 instructs the optical disk drive device 205 to execute a closing process in accordance with a control program incorporated with the closing process unit 217.

The drive control unit 231 of the optical disk drive device 205 records data into a border-out area in accordance with a control program incorporated with the border-out area recording unit 261.

As to the operation of recording data to a border-out area, dummy data is recorded into the border-out area 1312, excluding the state determination area 1336, in the data structure diagram of FIG. 13, and dummy data in recorded in the border-out area 1310, excluding the state determination area 1334. For example, the dummy data is 00h.

(S1702) The drive control unit 231 reproduces data from the physical format information area 1332 provided in the lead-in area 108, in accordance with a control program incorporated with the physical format information reproducing unit 262.

When the physical format information area 1332 included in the lead-in area 108 is not unrecorded as shown in FIG. 13, the optical disk drive device 205 stores reproduced physical format information into the physical format information memory 266 of the memory circuit 232 and then executes step S1703 and thereafter.

When the physical format information area 1332 included in the lead-in area 108 is unrecorded (for example, see FIG. 16), data cannot be reproduced from the designated physical format information area 1332. In this case, the drive control unit 231 executes step S1705 and thereafter.

(S1703) The drive control unit 231 records 00h as dummy data into the state determination area 1334, which is unrecorded in FIG. 18, for example, in accordance with a control program incorporated with the state determination area recording unit 264. Thereby, the state determination area 1334 which is not unrecorded is created as shown in FIG. 13.

(S1704) In accordance with a control program incorporated with the border-in area recording unit 265, the drive control unit 231 creates physical format information and records the physical format information in the border-in area from the head of the unrecorded area 138 of FIG. 18 and thereafter, for example. In this recording operation, the border-in area 1311, including the physical format information area 1335, is recorded following the border-out area 1310 as shown in FIG. 13, for example.

(S1705) In accordance with a control program incorporated with the physical format information recording unit 265, the drive control unit 231 creates physical format information, and records the physical format information into the physical format information area 1332 included in the lead-in area 108.

When the above-described file recording and closing processes are executed with respect to the information recording medium 1300 having a formatted data structure shown in FIG. 16, a data structure shown in FIG. 18 is created in the information recording medium 1300. The address information of state determination areas are managed using a record management area (not shown) existing in an inner track inside a lead-in area.

When a file recording process is executed with respect to the information recording medium 1300 in which the data structure of FIG. 18 has been recorded, a Datafile shown in FIG. 14 and a file structure are additionally recorded. Further, when a closing process is executed in accordance with a procedure shown in FIG. 17, the data structure of FIG. 13 is created in the information recording medium 1300.

A procedure of reproducing an AVfile in accordance with the flowchart of FIG. 19 will be described with reference to the data structures of FIGS. 13 and 16 and the block diagram of FIG. 15.

(S1901) When the drive control unit 231 detects that a disk is inserted into the optical disk drive device 205, the drive control unit 231 actuates the recording/reproducing unit 234 in accordance with the control program incorporated with the physical format reproducing unit 262, and reproduces data recorded in the physical format information area 1332 of the lead-in area 108. Thereafter, the reproduced physical format information of the reproduced physical format information area 1332 is transferred to the physical format information memory 266.

(S1902) The drive control unit 231 retrieves the address information of a state determination area from the address information of a border-out area included in the physical format information retrieved in step S1901 or S1904 in accordance with the control program incorporated with the physical format information reproducing unit 262. Thereafter, the drive control unit 231 makes an attempt to reproduce data in the state determination area. In FIG. 13, the address information 1342 of the border-out area 1310 recorded in the physical format information area 1332 includes the address information of the state determination area 1334, and the address information 1346 of the border-out area 1312 recorded in the physical format information area 1335 includes the address information of the state determination area 1336.

When the state determination area designated by step S1902 is not unrecorded, step S1903 and thereafter are executed. When the state determination area designated by step S1902 is unrecorded, step S1905 and thereafter are executed.

(S1903) The drive control unit 231 executes reproduction of a border-in area included in the physical format information using the address information of the border-in area obtained in step S1901 or S1904, in accordance with the control program incorporated with the physical format information reproducing unit 262.

In FIG. 13, the address information 1343 of the border-in area recorded in the physical format area 1332 includes the address information of the border-in area 1310.

(S1904) The drive control unit 231 transfers the physical format information reproduced in step S1903 to the physical format information memory 266 of the memory circuit 232 in accordance with the control program incorporated with the physical format information reproducing unit 262.

(S1905) The drive control unit 231 refers to the latest physical format information stored in the physical format information memory 266 in accordance with the control program incorporated with the physical format information reproducing unit 262, and obtains the physical address of the end of the accessible area from the address information of the logical zone. In FIG. 13, since a second logical zone 116 is positioned at the end of the accessible area, the physical address of the end of the accessible area can be obtained based on the address information 144 of the second logical zone 116 recorded in the physical format information area 1335.

(S1906) The system control unit 201 instructs the optical disk drive device 205 to reproduce the volume structure area 118 in accordance with a control program incorporated with the volume structure reproducing unit 214.

The optical disk drive device 205 transfers the volume structure of the loaded information recording medium 1300 to the data memory 221 of the memory circuit 202. In this case, a volume structure as shown in FIG. 16 is read out.

Thereafter, the system control unit 201 obtains the address information of a file set descriptor 161 or a partition starting location 405 from the volume structure read out. Further, the system control unit 201 recognizes that a VAT structure is recorded, based on a type 1 partition map 407 registered at partition reference number 0 and a virtual partition map 408 registered at partition reference number 1.

(S1907) The system control unit 201 obtains the address information of a logical zone stored in the physical format information memory 266 of the optical disk drive device 205 as the physical address of the end of the accessible area, in accordance with a control program incorporated with the VAT structure reproducing unit 282. The system control unit 201 converts a physical address to a logical address. Further, the system control unit 201 instructs the optical disk drive device 205 to reproduce the VATICB 176 recorded at the end of the accessible area.

The optical disk drive device 205 reads and transfers the VATICB 176 to the VAT structure memory 283.

Thereafter, the system control unit 201 interprets the address information of the VAT included in the VATICB 176 read out, reads the VAT 1375 recorded in the VAT structure area 1330, and stores the VAT 1375 into the VAT structure memory 283.

(S1908) The system control unit 201 refers to a VAT entry, in which the file entry of a target file or directory is registered, using the VAT obtained in step S1907 when a target file and the management information thereof are managed using virtual addresses, in accordance with a control program incorporated with the file structure reproducing unit 215. Thereafter, the system control unit 201 converts a virtual address to a logical address and, using the file set descriptor 161 as a starting point, sequentially reads out a root directory file entry (FE) 174 and a root directory recorded therein, a directory (AV-Dir) FE 167 and a directory (AV-Dir) recorded therein, and an AVfile FE 166. Thereafter, the system control unit 201 obtains a position at which an AVfile is recorded.

(S1909) Finally, the system control unit 201 reads out an AVfile 165 in accordance with a control program incorporated with the file reproducing unit 216, thereby completing the file reproduction.

However, when an information reproducing apparatus, which does not have an ability to detect a position in an unrecorded area, obtains the end position of an accessible area from an information recording medium which records information in the above-described manner, the operation of reproducing information from a physical format information area and the operation of determining the recording state of a state determination area need to be alternately executed. Therefore, a time required for searching the end position of an accessible area is disadvantageously long.

Further, when an information reproducing apparatus searches a target file, both a volume structure and a VAT structure need to be searched. Therefore, the number of times data is recorded in the same area is not limited. When the information recording medium 1300 is used, a file search process needs to be more complicated and therefore a processing time is long, compared with when an information recording medium having a volume file structure which does not use an address conversion mechanism such as VAT is employed.

Furthermore, an AVfile may be used not only in a PC system including a large capacity memory and a high-speed processor, but also in a household AV apparatus including a limited capacity memory and a relatively poor performance processor. In this case, when an AVfile is recorded on a disk after a number of data files which are used only by PC systems has been recorded on the disk, the size of a VAT becomes large in proportion to the total number of recorded files or the management information thereof. Therefore, AVfiles are managed using virtual addresses having relatively large values. A household AV apparatus requires a larger capacity memory or a higher performance processor.

SUMMARY OF THE INVENTION

According to one aspect of the present invention, an information recording medium comprises a data recording area. A lead-in area and a volume space are allocated in the data recording area in advance. The volume space is constructed so as to allow a logical zone for recording at least a volume-file structure and an over-run protection area for preventing an access to an unrecorded area to be alternately allocated in the volume space. The lead-in area and the over-run protection area each include a chain volume management information area for storing chain volume management information. The chain volume management information includes address information of a subsequent logical zone and address information of a subsequent chain volume management information area.

In one embodiment of this invention, the chain volume management information area is provided at a fixed position in the over-run protection area, and the address information of the subsequent chain volume management information area indicates a head address of the subsequent over-run protection area.

In one embodiment of this invention, the volume space is constructed so as to allow a lead-out area subsequent to a last over-run protection area to be allocated in the volume space. Dummy data is recorded in the chain volume management information area included in the last over-run protection area.

According to another aspect of the present invention, an information recording medium comprises a data recording area. A lead-in area and a volume space are allocated in the data recording area in advance. The volume space is constructed so as to allow an advanced VAT structure area for storing at least an advanced VAT to be allocated in the volume space. The advanced VAT is information for managing a correspondence between a virtual address indicating an address in a virtual address space and a logical address indicating an address in a logical address space. Basic structure information indicating a file structure is provided at a specific virtual address in the advanced VAT, the basic structure information being indispensable for searching all files recorded in the information recording medium.

In one embodiment of this invention, the basic structure information includes VAT entries for a file set descriptor and a file entry of a root directory. The advanced VAT includes a first VAT entry for assigning a logical address of the file set descriptor to a virtual address 0, and a second VAT entry for assigning a logical address of the file entry of the root directory to a virtual address 1.

In one embodiment of this invention, the advanced VAT structure area is allocated at an end of an accessible area.

In one embodiment of this invention, specific application structure information indicating a file structure is allocated in a specific virtual address range in the advanced VAT, the specific application structure information being indispensable for searching an AV file recorded in the information recording medium. The basic structure information and the specific application structure information are recorded within one sector from a head of the advanced VAT.

In one embodiment of this invention, the advanced VAT structure area is allocated at an end of an accessible area.

In one embodiment of this invention, the volume space is constructed so as to allow a logical zone for recording at least a volume-file structure and an over-run protection area for preventing an access to an unrecorded area to be alternately allocated in the volume space. The lead-in area and the over-run protection area each include a chain volume management information area for recording chain volume management information. The chain volume management information includes address information of a subsequent logical zone and address information of a subsequent chain volume management information area.

In one embodiment of this invention, the chain volume management information area is allocated at a fixed position in the over-run protection area, and the address information of the subsequent chain volume management information area indicates a head address of the subsequent over-run protection area.

In one embodiment of this invention, the volume space is constructed so as to allow a lead-out area subsequent to a last over-run protection area to be allocated in the volume space. Dummy data is recorded in the chain volume management information area included in the last over-run protection area.

In one embodiment of this invention, the basic structure information includes VAT entries for a file set descriptor and a file entry of a root directory. The advanced VAT includes a first VAT entry for assigning a logical address of the file set descriptor to a virtual address 0, and a second VAT entry for assigning a logical address of the file entry of the root directory to a virtual address 1.

In one embodiment of this invention, specific application structure information indicating a file structure is allocated in a specific virtual address range in the advanced VAT, the specific application structure information being indispensable for searching an AV file recorded in the information recording medium.

In one embodiment of this invention, the basic structure information and the specific application structure information are recorded within one sector from a head of the advanced VAT.

In one embodiment of this invention, the advanced VAT structure area is allocated at an end of an accessible area.

According to another aspect of the present invention, a method for recording information into an information recording medium comprises a data recording area. A lead-in area and a volume space are allocated in the data recording area in advance. The method comprises the step of allocating a logical zone for recording at least a volume-file structure and an over-run protection area for preventing an access to an unrecorded area alternately in the volume space. The lead-in area and the over-run protection area each include a chain volume management information area. The method further comprises the step of recording the chain volume management information including address information of a subsequent logical zone and address information of a subsequent chain volume management information into the chain volume management information area.

According to another aspect of the present invention, a method for recording information into an information recording medium comprises a data recording area. A lead-in area and a volume space are allocated in the data recording is area in advance. The method comprises the steps of allocating an advanced VAT structure area in the volume space, and recording an advanced VAT for managing a correspondence between a virtual address indicating an address in a virtual address space and a logical address indicating an address in a logical address space into the advanced VAT structure area. Basic structure information indicating a file structure is allocated at a specific virtual address in the advanced VAT, the basic structure information being indispensable for searching all files recorded in the information recording medium.

In one embodiment of this invention, specific application structure information indicating a file structure is allocated in a specific virtual address range in the advanced VAT, the specific application structure information being indispensable for searching an AV file recorded in the information recording medium. The basic structure information and the specific application structure information are provided within one sector from a head of the advanced VAT.

In one embodiment of this invention, the method comprises the step of allocating a logical zone for recording at least a volume-file structure and an over-run protection area for preventing an access to an unrecorded area alternately in the volume space. The lead-in area and the over-run protection area each include a chain volume management information area. The method comprises the step of recording the chain volume management information including address information of a subsequent logical zone and address information of a subsequent chain volume management information into the chain volume management information area.

According to another aspect of the present invention, a device for recording information into an information recording medium comprises a data recording area. A lead-in area and a volume space are allocated in the data recording area in advance. The device comprises a section for allocating a logical zone for recording at least a volume-file structure and an over-run protection area for preventing an access to an unrecorded area alternately in the volume space. The lead-in area and the over-run protection area each include a chain volume management information area. The device further comprises a section for recording the chain volume management information including address information of a subsequent logical zone and address information of a subsequent chain volume management information into the chain volume management information area.

According to another aspect or the present invention, a device for recording information into an information recording medium comprises a data recording area. A lead-in area and a volume space are allocated in the data recording area in advance. The device comprises a section for allocating an advanced VAT structure area in the volume space. A section for recording an advanced VAT for managing a correspondence between a virtual address indicating an address in a virtual address space and a logical address indicating an address in a logical address space into the advanced VAT structure area. Basic structure information indicating a file structure is allocated at a specific virtual address in the advanced VAT, the basic structure information being indispensable for searching all files recorded in the information recording medium.

In one embodiment of this invention, specific application structure information indicating a file structure is allocated in a specific virtual address range in the advanced VAT, the specific application structure information being indispensable for searching an AV file recorded in the information recording medium. The basic structure information and the specific application structure information are provided within one sector from a head of the advanced VAT.

In one embodiment of this invention, the device comprises a section for allocating a logical zone for recording at least a volume-file structure and an over-run protection area for preventing an access to an unrecorded area alternately in the volume space. The lead-in area and the over-run protection area each include a chain volume management information area. The device comprises a section for recording the chain volume management information including the address information of a subsequent logical zone and the address information of a subsequent chain volume management information into the chain volume management information area.

According to another aspect of the present invention, a method for reproducing information recorded in an information recording medium comprises a data recording area. A lead-in area and a volume space are allocated in the data recording area in advance, a logical zone for recording at least a volume-file structure and an over-run protection area for preventing an access to an unrecorded area are alternately allocated in the volume space, the lead-in area and the over-run protection area each include a chain volume management information area, and the chain volume management information including address information of a subsequent logical zone and address information of a subsequent chain volume management information area is recorded in the chain volume management information area. The method comprises the steps of accessing the chain volume management information area included in each of the lead-in area and the over-run protection area in a chained manner, and performing a reproduction operation in accordance with information read out from the chain volume management information area.

According to another aspect of the present invention, a method for reproducing information recorded in an information recording medium comprises a data recording area. A lead-in area and a volume space are allocated in the data recording area in advance, a volume structure area and an advanced VAT structure area are allocated in the volume space, an advanced VAT information for managing a correspondence between a virtual address indicating an address in a virtual address space and a logical address indicating an address in a logical address space is recorded in the advanced VAT structure area, and basic structure information indicating a file structure is allocated at a specific virtual address in the advanced VAT, the basic structure information being indispensable for searching all files recorded in the information recording medium. The method comprises the steps of obtaining a logical address of the basic structure information from the advanced VAT stored in the advanced VAT structure area without accessing the volume structure area, and reading out the basic structure information in accordance with the logical address of the basic structure information.

According to another aspect of the present invention, a method for reproducing information recorded in an information recording medium comprises a data recording area. A lead-in area and a volume space are allocated in the data recording area in advance, an advanced VAT structure area is allocated in the volume space, an advanced VAT information for managing a correspondence between a virtual address indicating an address in a virtual address space and a logical address indicating an address in a logical address space is recorded in the advanced VAT structure area, basic structure information indicating a file structure is allocated at a specific virtual address in the advanced VAT, the basic structure information being indispensable for searching all files stored in the information recording medium, specific application structure information indicating a file structure is allocated in a specific virtual address range in the advanced VAT, the specific application structure information being indispensable for searching an AV file recorded in the information recording medium, and the basic structure information and the specific application structure information are allocated within one sector from a head of the advanced VAT. The method comprises the steps of reading out information within one sector from a head of the advanced VAT recorded in the advanced VAT structure area, and performing a reproduction operation based on the basic structure information and the specific application structure information included in the read out information.

In one embodiment of this invention, a logical zone for storing at least a volume-file structure and an over-run protection area for preventing an access to an unrecorded area are alternately allocated in the volume space, the lead-in area and the over-run protection area each include a chain volume management information area, and the chain volume management information including address information of a subsequent logical zone and address information area of a subsequent chain volume management information is recorded in the chain volume management information area. The method comprises the steps of accessing the chain volume management information area included in each of the lead-in area and the over-run protection area in a chained manner, and performing a reproduction operation in accordance with information read out from the chain volume management information area.

According to another aspect of the present invention, a device for reproducing information recorded in an information recording medium comprises a data recording area. A lead-in area and a volume space are allocated in the data recording area in advance, a logical zone for storing at least a volume-file structure and an over-run protection area for preventing an access to an unrecorded area are alternately allocated in the volume space, the lead-in area and the over-run protection area each include a chain volume management information area, and the chain volume management information area including address information of a subsequent logical zone and address information of a subsequent chain volume management information area is recorded in the chain volume management information area. The device comprises a section for accessing the chain volume management information area included in each of the lead-in area and the over-run protection area in a chained manner, and a section for performing a reproduction operation in accordance with information read out from the chain volume management information area.

According to another aspect of the present invention, a device for reproducing information recorded in an information recording medium comprises a data recording area. A lead-in area and a volume space are allocated in the data recording area in advance, a volume structure area and an advanced VAT structure area are allocated in the volume space, an advanced VAT information for managing a correspondence between a virtual address indicating an address in a virtual address space and a logical address indicating an address in a logical address space is recorded in the advanced VAT structure area, and basic structure information indicating a file structure is allocated at a specific virtual address in the advanced VAT, the basic structure information being indispensable for searching all files recorded in the information recording medium. The device comprises a section for obtaining a logical address of the basic structure information from the advanced VAT stored in the advanced VAT structure area without accessing the volume structure area, and a section for reading out the basic structure information in accordance with the logical address of the basic structure information.

According to another aspect of the present invention, a device for reproducing information recorded in an information recording medium comprises a data recording area. A lead-in area and a volume space are allocated in the data recording area in advance, an advanced VAT structure area is allocated in the volume space, an advanced VAT for managing a correspondence between a virtual address indicating an address in a virtual address space and a logical address indicating an address in a logical address space is recorded in the advanced VAT structure area, basic structure information indicating a file structure is allocated at a specific virtual address in the advanced VAT, the basic structure information being indispensable for searching all files recorded in the information recording medium, specific application structure information indicating a file structure is allocated in a specific virtual address range in the advanced VAT, the specific application structure information being indispensable for searching an AV file recorded in the information recording medium, and the basic structure information and the specific application structure information are provided within one sector from a head of the advanced VAT. The device comprises a section for reading out information within one sector from a head of the advanced VAT recorded in the advanced VAT structure area, and a section for performing a reproduction operation based on the basic structure information and the specific application structure information included in the read out information.

In one embodiment of this invention, a logical zone for recording at least a volume-file structure and an over-run protection area for preventing an access to an unrecorded area are alternately allocated in the volume space, the lead-in area and the over-run protection area each include a chain volume management information area, and the chain volume management information including address information of a subsequent logical zone and address information of a subsequent chain volume management information is recorded in the chain volume management information area. The device comprises a section for accessing the chain volume management information area included in each of the lead-in area and the over-run protection area in a chained manner, and a section for performing a reproduction operation in accordance with information read out from the chain volume management information area.

According to another aspect of the present invention, an information recording medium comprises a data recording area. A lead-in area and a volume space are allocated in the data recording area in advance. A logical zone for recording at least a volume-file structure and an over-run protection area for preventing an access to an unrecorded area are alternately allocated in the volume space. The lead-in area and the over-run protection area each include a chain volume management information area. Chain volume management information including address information of a subsequent logical zone and address information of a subsequent chain volume management information area is recorded in the chain volume management information area.

In one embodiment of this invention, the chain volume management information area is provided at a fixed position in the over-run protection area, and the address information of the subsequent chain volume management information indicates a head address of the subsequent over-run protection area.

In one embodiment of this invention, a lead-out area subsequent to a last over-run protection area is allocated in the volume space. Dummy data is recorded in the chain volume management information area included in the last over-run protection area.

According to another aspect of the present invention, an information recording medium comprises a data recording area. A lead-in area and a volume space are allocated in the data recording area in advance. An advanced VAT structure area is allocated in the volume space. Advanced VAT information for managing a correspondence between a virtual address indicating an address in a virtual address space and a logical address indicating an address in a logical address space is recorded in the advanced VAT structure area. Basic structure information indicating a file structure is recorded at a specific virtual address in the advanced VAT, the basic structure information being indispensable for searching all files recorded in the information recording medium.

In one embodiment of this invention, the basic structure information includes VAT entries for a file set descriptor and a file entry of a root directory. The advanced VAT includes a first VAT entry for assigning a logical address of the file set descriptor to a virtual address 0, and a second VAT entry for assigning a logical address of the file entry of the root directory to a virtual address 1.

In one embodiment of this invention, the advanced VAT structure area is allocated at an end of an accessible area.

In one embodiment of this invention, specific application structure information indicating a file structure is allocated in a specific virtual address range in the advanced VAT, the specific application structure information being indispensable for searching an AV file recorded in the information recording medium. The basic structure information and the specific application structure information are recorded within one sector from a head of the advanced VAT.

In one embodiment of this invention, the advanced VAT structure area is allocated at an end of an accessible area.

In one embodiment of this invention, a logical zone for recording at least a volume-file structure and an over-run protection area for preventing an access to an unrecorded area is alternately allocated in the volume space. The lead-in area and the over-run protection area each include a chain volume management information area. Chain volume management information including address information of a subsequent logical zone and address information of a subsequent chain volume management information area is recorded in the chain volume management information area.

In one embodiment of this invention, the chain volume management information area is allocated at a fixed position in the over-run protection area, and the address information of the subsequent chain volume management information area indicates a head address of the subsequent over-run protection area.

In one embodiment of this invention, a lead-out area subsequent to a last over-run protection area is allocated in the volume space. Dummy data is recorded in the chain volume management information area included in the last over-run protection area.

In one embodiment of this invention, the basic structure information includes VAT entries for a file set descriptor and a file entry of a root directory. The advanced VAT includes a first VAT entry for assigning a logical address of the file set descriptor to a virtual address 0, and a second VAT entry for assigning a logical address of the file entry of the root directory to a virtual address 1.

In one embodiment of this invention, specific application structure information indicating a file structure is allocated in a specific virtual address range in the advanced VAT, the specific application structure information being indispensable for searching an AV file recorded in the information recording medium.

In one embodiment of this invention, the basic structure information and the specific application structure information are recorded within one sector from a head of the advanced VAT.

In one embodiment of this invention, the advanced VAT structure area is allocated at an end of an accessible area.

Thus, the invention described herein makes possible the advantages of providing (1) an information recording medium in which an information reproducing apparatus is prevented from accessing an unrecorded area and is able to search the end position of an accessible area at a higher speed, a method and an apparatus for recording information in the information recording medium, and a method and an apparatus for reproducing information recorded in the information recording medium; and (2) an information recording medium in which files managed using VAT can be searched at a higher speed and the load of reproduction of an AV file by a household AV apparatus can be reduced, a method and an apparatus for recording information in the information recording medium, and a method and an apparatus for reproducing information recorded in the information recording medium.

These and other advantages of the present invention will become apparent to those skilled in the art upon reading and understanding the following detailed description with reference to the accompanying figures.

BRIEF DESCRIPTION OF THE DRAWINGS

FIG. 2A is a diagram showing a detailed data structure of an advanced VAT 163.

FIG. 2B is a diagram showing a detailed data structure of an advanced VAT 169.

FIG. 2C is a diagram showing a detailed data structure of an advanced VAT 175.

FIG. 3 is a diagram showing a structure of an information recording/reproducing apparatus 300 according to an example of the present invention.

DESCRIPTION OF THE PREFERRED EMBODIMENTS

Figure 1:
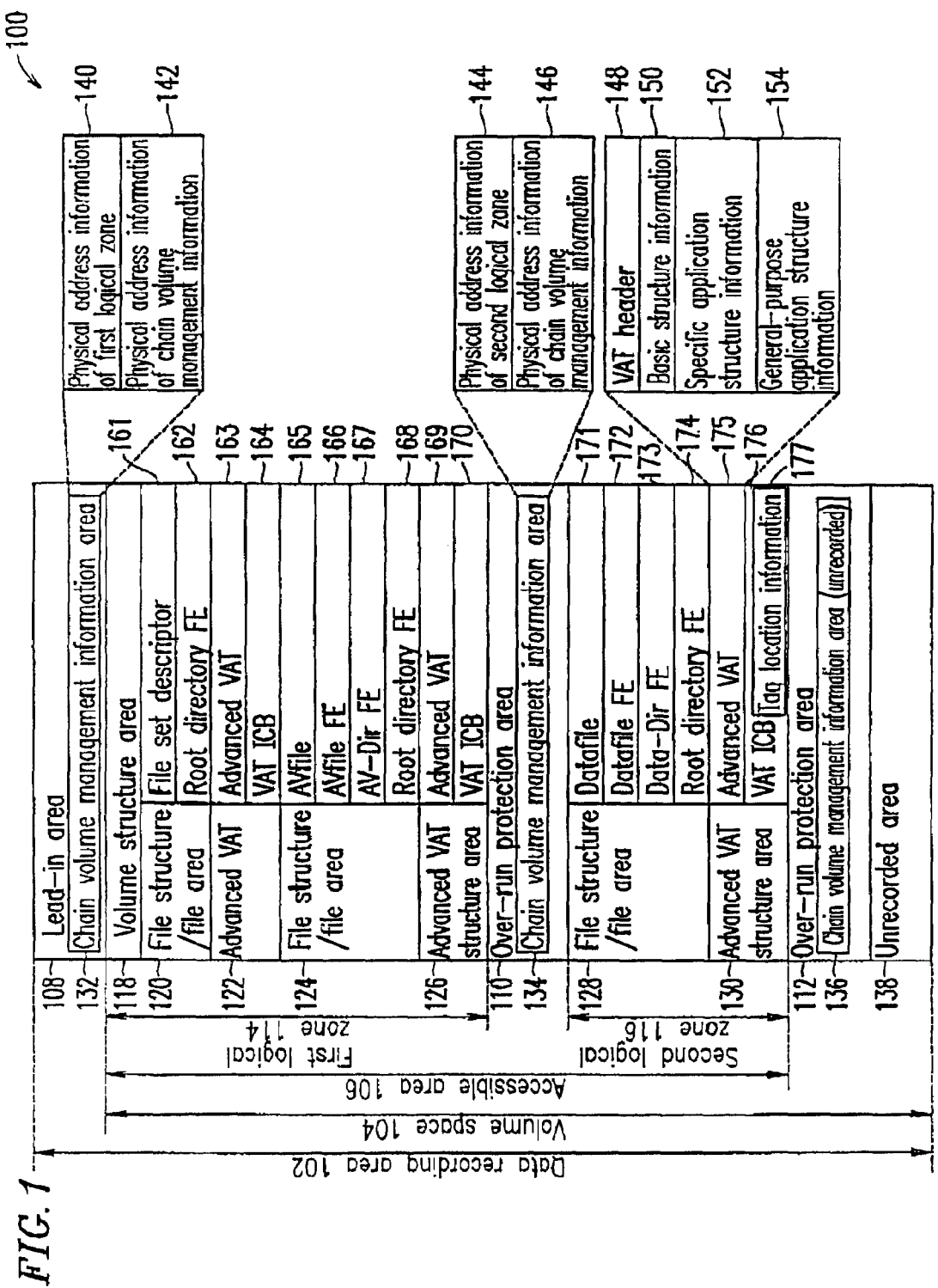
FIG. 1 is a diagram showing a data structure of an information recording medium 100 according to an example of the present invention.

An information recording medium according to the present invention includes chain volume management information areas provided in a lead-in area and each over-run protection area. In each chain volume management information, the address information of a subsequent logical zone and the address information of the chain volume management information area are recorded.

Further, an information reproducing apparatus according to the present invention using such an information recording medium accesses a lead-in area and subsequent over-run protection areas which are chained until an unrecorded area or chain volume management information in which disk end information is recorded is detected, reads out the latest chain volume management information, and obtains the physical address of the end of an accessible area from the address information of the last logical zone. In such an accessing operation of the information reproducing apparatus, since the determination of recording states of subsequent logical zones and the obtaining of the address information of subsequent chain volume management information areas are integrally executed, it is possible to execute the obtaining of the physical address of the end of an accessible area and the read operation of subsequent volume file management information at a high speed using a simpler procedure.

Still further, in the information recording medium of the present invention, a VAT having an entry, to which a virtual address having a specific and small value is assigned, is recorded as basic structure information indispensable for interpreting a volume file structure and specific application structure information for managing a file used even by a household AV apparatus.

For such an information recording medium, the information reproducing apparatus searches the latest VAT using a VATICB recorded at the end of an accessible area, and interprets the basic structure information or specific application structure information registered in the VAT, using a specific virtual address to read out a target file. In such an access operation of the information reproducing apparatus, an access to a volume structure area is skipped and a VAT is read out. Position information, in which the file entry of a target file is recorded, is searched in the VAT, thereby making it possible to read out the target file at a higher speed.

Furthermore, when an information recording medium records a VAT having an entry in which a specific small value is assigned to the management information of an AV file used for a specific application (e.g., in the case of an AV file used in a household AV apparatus), even if the whole VAT has a relatively large size, only a specific portion of the VAT in which an entry having a specific virtual address is registered is searched, thereby making it possible to read out a target file by searching a VAT using a small capacity memory and a low performance processor.

Hereinafter, the present invention will be described by way of illustrative examples with reference to the accompanying drawings.

An exemplary information recording medium according to the present invention is a DVD-R disk, a DVD-RW disk, or the like, in which files are recorded in a volume space and the files are managed using a data structure defined with the ISO/IEC 13346 standards or the UDF (Universal Disk Format) standards. Such an information recording medium, a method and an apparatus for recording information into the information recording medium, and a method and an apparatus for reproducing information from the information recording medium will be described below.

Note that in the following description, descriptors, pointers, and the like are recorded as a volume file structure in an information recording medium in accordance with the ISO/IEC 13346 or UDF standards, unless otherwise specified.

1. Structure of Information Recording Medium

FIG. 1 is a diagram showing a data structure of an information recording medium 100 according to an example of the present invention. The information recording medium 100 is in conformity with the DVD-R physical standards (version 2.0), for example. In the information recording medium 100, a file is recorded using a volume file structure defined by the DVD-R file system standards (version 2.0).

The information recording medium 100 includes a lead-in area 108 and a volume space 104.

The lead-in area 108 is positioned at the head of a data record area 102. The volume space 104 is positioned in an area of the information recording medium 100 adjacent to an outer side of the lead-in area 108.

The lead-in area 108 includes a chain volume management information area 132.

An over-run protection area 110 for preventing access to an unrecorded area is assigned to the volume space 104. The over-run protection area 110 includes a chain volume management information area 134.

An over-run protection area 112 is also provided in the volume space 104. The over-run protection area 112 includes a chain volume management information area 136.

A first logical zone 114 for recording at least a volume file structure is created between the lead-in area 108 and the over-run protection area 110. A second logical zone 116 for recording at least a volume file structure is created between the over-run protection area 110 and the over-run protection area 112.

In the chain volume management information area 132, chain volume management information is recorded which includes the address information 140 of the first logical zone 114 and the address information 142 of the chain volume management information area 134.

In the chain volume management information area 134, chain volume management information is recorded which includes the address information 144 of the second logical zone 116 and the address information 146 of the chain volume management information area 136.

The volume space 104 includes an unrecorded area 138.

In the first logical zone 114, a volume structure area 118, a file structure/file area 120 and an advanced VAT structure area 122 are sequentially provided in a formatting process. Note that the procedure of the formatting process will be described later in detail with reference to FIG. 4.

In the volume structure area 118, a volume structure is recorded.

In the file structure/file area 120, a file set descriptor 161 and a file entry 162 for managing a root directory are recorded.

In the advanced VAT structure area 122, an advanced VAT 163 and a VATICB 164 are recorded. The recording position of the advanced VAT 163 is designated by the VATICB 164 provided in the end sector of an area in which data is recorded.

In the first logical zone 114, a file structure/file area 124 and an advanced VAT structure area 126 are sequentially allocated following the advanced VAT structure area 122 in a file recording process. Note that the procedure of the file recording process will be described later in detail with reference to FIG. 6.

In the file structure/file area 124, a file and various file entries are recorded. In an example shown in FIG. 1, an AV file 165, an AV file FE 166 for managing the AV file 165, a directory file (AV-Dir) FE 167 for managing a directory file (AV-Dir), and a root directory FE 168 are recorded in the file structure/file area 124.

Note that for the sake of simplicity, it is assumed that these directory file FEs include a directory file itself having a relatively small size.

In the advanced VAT structure area 126, an advanced VAT 169 and a VATICB 170 are recorded.

In the volume space 104, the over-run protection area 110 including the unrecorded chain volume management information area 134 is allocated following the advanced VAT structure area 126 in a closing process. Thereafter, the chain volume management information area 132 is recorded in the lead-in area 108. The closing process is executed in order to enable the latest volume file structure to be searched while preventing an information reproducing apparatus, which does not have an ability to detect a position in an unrecorded area, from accessing an unrecorded area.

Note that the procedure of the closing process will be described later in detail with reference to FIG. 7.

Next, in the second logical zone 116, a file structure/file area 128 and an advanced VAT structure area 130 are sequentially allocated following the over-run protection area 110 in a further file recording process.

In the file structure/file area 128, a file and various file entries are recorded. In an example shown in FIG. 1, a Datafile 171, a Datafile FE 172 for managing the Datafile 171, a directory file (Data-Dir) FE 173 for managing a directory file (Data-Dir), and a root directory FE 174 are recorded in the file structure/file area 128.

In the advanced VAT structure area 130, an advanced VAT 175 and a VATICB 176 are recorded.

In the volume space 104, in a further closing process, the over-run protection area 112 including the unrecorded chain volume management information area 136 is allocated following the advanced VAT structure area 130, and the chain volume management information area 134 in the over-run protection area 110 is allocated.

As described above, every time a file record process or a closing process is executed, an additional logical zone is created in between the lead-in area 108 or the over-run protection area. A file structure/file area and an advanced VAT structure area are allocated in the logical zone.

The over-run protection area 112 is provided in order to prevent an information reproducing apparatus, which does not have an ability to detect a position in an unrecorded area, from overrunning into the unrecorded area 138 when the apparatus accesses the VATICB 176 or the chain volume management information area 136. The chain volume management information area 136 is an unrecorded area having several tracks. Recorded areas are provided before and after the chain volume management information area 136. Therefore, the information reproducing apparatus does not malfunction.

When a chain volume management information area is allocated in a specific position in an over-run protection area, the address information of the over-run protection area is easily obtained from the address information of the chain volume management information area.

Note that the address information of chain volume management information may indicate the head address of an over-run protection area (e.g., the physical address of a head sector).

For example, the chain volume management information area 136 is placed at a fixed position in the over-run protection area 112. The address information of the chain volume management information area 136 indicates the head address of an over-run protection area 112 (e.g., the physical address of a head sector). The same applies to the chain volume management information area 134.

The advanced VAT 175 includes a VAT header 148, basic structure information 150, specific application structure information 152, and general-purpose application structure information 154.

The basic structure information 150 is used to define a basic structure shared by a plurality of applications (e.g., a structure indispensable for interpreting a file structure, such as the file set descriptor 161 or the root directory file entry 162).

The specific application structure information 152 is used to define a specific application structure in association with a specific application out of a plurality of applications (e.g., a structure indispensable for searching an AVfile used in a household AV apparatus).

The general-purpose application structure information 154 is used to search a file in general applications, typically PC applications.

Note that the advanced VATs 163 and 169 each have a data structure (not shown) similar to that of the advanced VAT 175.

FIG. 2A is a diagram showing a detailed data structure of the advanced VAT 163. The advanced VAT 163 is recorded in the advanced VAT structure area 122 in a formatting process.

The basic structure area of the advanced VAT 163 includes a VAT entry 0 to which a virtual address 0 is assigned and a VAT entry 1 to which a virtual address 1 is assigned. The logical address of a root directory file entry is recorded in the VAT entry 1.

As described above, the VAT entry 0 is used to assign the logical address of a file set descriptor to the virtual address 0, and the VAT entry 1 is used to assign the logical address of a root directory file entry to the virtual address 1.

Note that the VAT entries 0 and 1 generally follow a VAT header having a length of 152 bytes.

The specific application structure information of the advanced VAT 163 includes VAT entries 2 through 255. In the advanced VAT 163, the VAT entries 2 through 255 are unused. Specifically, a value FFFFFFFFh is set in each of the VAT entries 2 through 255.

The general-purpose application structure information of the advanced VAT 163 includes VAT entries 256 through 473. In the advanced VAT 163, the VAT entries 256 through 473 are unused. Specifically, a value FFFFFFFFh is set in each of the VAT entries 256 through 473.

FIG. 2B is a diagram showing a detailed data structure of the advanced VAT 169. The advanced VAT 169 is recorded in the advanced VAT structure area 126 in a process for recording an AVfile.

In the advanced VAT 169, the logical address of a directory (AV-Dir) file entry for managing an AVfile is recorded at the VAT entry 2, and the logical address of a AVfile file entry is recorded at the VAT entry 3.

In this manner, the logical address of a directory (AV-Dir) file entry for managing an AVfile is recorded at the virtual address 2, and the logical address of a AVfile file entry is recorded at the virtual address 3.

Note that the contents of the other VAT entries in the advanced VAT 169 are the same as those of the corresponding VAT entries in the advanced VAT 163.

FIG. 2C is a diagram showing a detailed data structure of the advanced VAT 175. The advanced VAT 175 is recorded in the advanced VAT structure area 130 in a process for recording a Datafile.

In the advanced VAT 175, the logical address of a directory (Data-Dir) file entry for managing a data file is recorded in VAT entry 256, and the logical address of a data file file entry is recorded in VAT entry 257.

In this manner, the logical address of the directory (Data-Dir) file entry for managing a data file is assigned to virtual address 256, and the logical address of the data file file entry is recorded in virtual address 257.

Note that the contents of the other VAT entries in the advanced VAT 175 are the same as those of the corresponding VAT entries in the advanced VAT 169.

Note that in each of the advanced VATs 163, 169 and 175, FFFFFFFFh, which is a logical address which does not exist in a logical address space, is registered in an unused VAT entry. The advanced VATs 163, 169 and 175 each include a sector having a length of 2048 bytes.

In this example, a virtual address space is allocated in specific application structure information indispensable for searching an AV file used even in a household AV apparatus. Similarly, a virtual address space is allocated in each of a plurality of pieces of specific application structure information. For example, the virtual addresses 3 through 127 are assigned to a file structure required for searching video files, while the virtual addresses 128 through 255 are assigned to a file structure required for searching audio files.

When a number of general-purpose files or directories are registered so that the data size of the advanced VAT in the general-purpose application structure information exceeds 2048 bytes, the advanced VAT is divided into a plurality of sectors.

As described above, even when an advanced VAT is divided into a plurality of sectors, since basic structure information and specific application structure information each have restricted virtual addresses, the basic structure information and the specific application structure information are recorded in one sector from the head of the advanced VAT structure area.

Therefore, a household AV apparatus having a restricted capacity memory and a relatively low performance processor can read out an AV file at a high speed consistently using only the head sector of an area in which an advanced VAT is recorded, even when the size of the advanced VAT becomes large as the total number of general-purpose files or directories registered in a volume space is increased.

2. Structure of Information Recording/reproducing apparatus

FIG. 3 is a diagram showing a structure of an information recording/reproducing apparatus 300 according to an example of the present invention.

The information recording/reproducing apparatus 300 functions as an information recording apparatus for recording information into the information recording medium 100 when a formatting process, a file recording process, or a closing process is executed. Further, the information recording/reproducing apparatus 300 functions as an information reproducing apparatus for reproducing information recorded in the information recording medium 100 when a file reproducing process is executed.

The information reproducing apparatus 300 includes a system control unit 201, a memory circuit 202, an I/O bus 203, a magnetic disk device 204, and an optical disk drive device 205.

The system control unit 201 is realized using a microprocessor including a system control program and a memory. Specifically, the system control unit 201 includes a volume structure recording unit 211, a file structure recording unit 212, a file recording unit 213, and an advanced VAT structure recording unit 271. Further, the system control unit 201 includes a file structure reproducing unit 215, a file reproducing unit 216, and an advanced VAT structure reproducing unit 272. Furthermore, the system control unit 201 includes a closing process unit 217 and a lead-out process unit 218.

The memory circuit 202 includes a data memory 221 and an advanced VAT structure memory 273.

The data memory 221 is used to calculate or temporarily store a volume structure, a file structure, and a file. The advanced VAT structure memory 273 is used to calculate or temporarily store an advanced VAT structure.

The optical disk drive device 205 includes a drive control unit 231, a memory circuit 232, an internal bus 233, a recording/reproducing unit 234, and an information recording medium 100.

The drive control unit 231 is realized using a microprocessor including a system control program and a memory. Specifically, the drive control unit 231 includes a chain volume management information recording unit 251, an over-run protection area recording unit 252, a chain volume management information reproducing unit 254, and a lead-out area recording unit 255.

The memory circuit 232 includes a chain volume management information memory 253 and a buffer memory 241.

The chain volume management information memory 253 is used to calculate or temporarily store chain volume management information. A buffer memory 241 is used to calculate or temporarily store data transferred to the optical disk drive device 205.

3. Formatting Process

Figure 4:
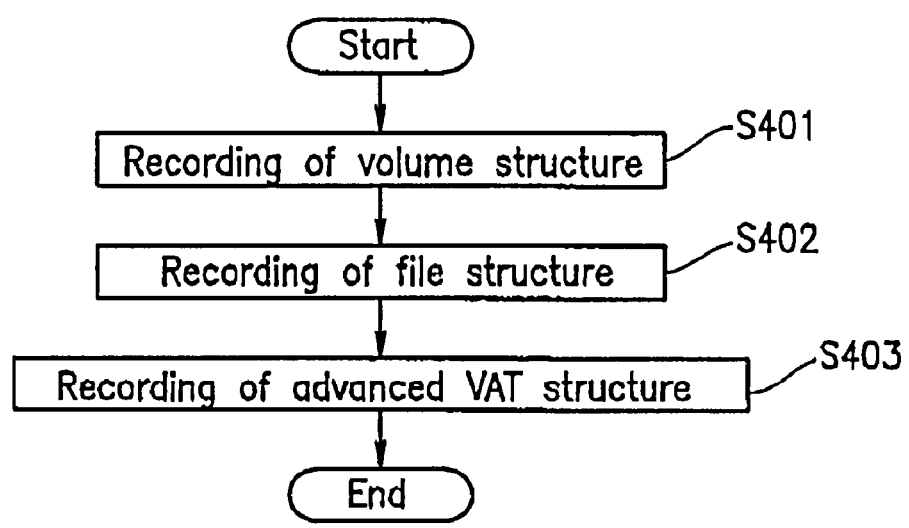
FIG. 4 is a flowchart showing a procedure of a formatting process.

FIG. 4 is a diagram showing the procedure of a formatting process. Hereinafter, the formatting process procedure will be described on a step-by-step basis.

Figure 5:
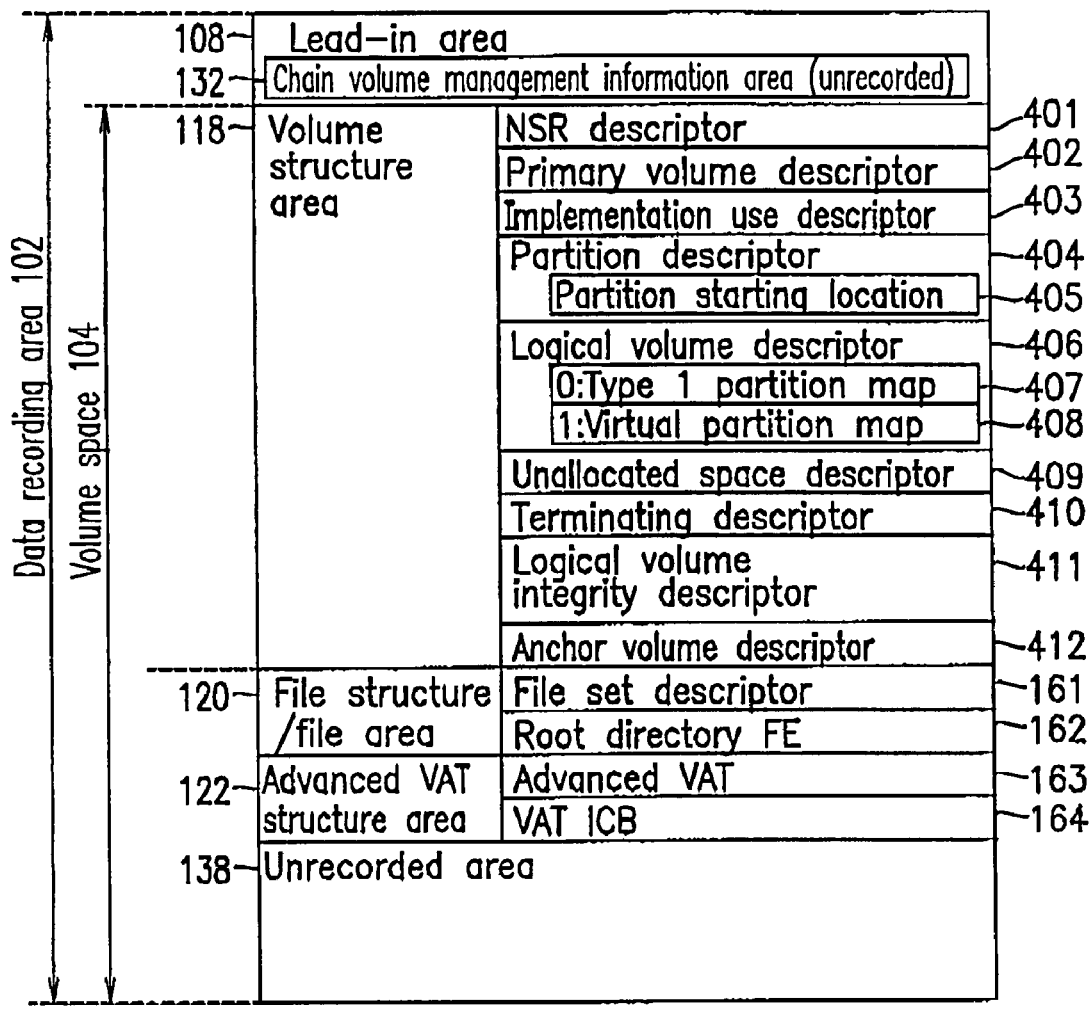
FIG. 5 is a diagram showing a data structure of an information recording medium after being formatted.

(S401) The system control unit 201 produces a volume structure, which will be recorded in the volume structure area 118, in the data memory 221 of the memory circuit 202 in accordance with a control program incorporated with the volume structure recording unit 211. Such a volume structure includes descriptors 401 through 412 and the like which hold various management information of a volume space 104 in conformity with the ISO/IEC 13346 standards (FIG. 5). The detailed data structure of the volume structure area 118 will be described later.

The system control unit 201 instructs the optical disk drive device 205 to record the volume structure produced in the data memory 221.

The optical disk drive device 205 records the volume structure transferred from the data memory 221 into the volume structure area 118. When the volume structure is completely recorded, the optical disk drive device 205 notices the recording completion to the system control unit 201.

(S402) The system control unit 201 produces a file set descriptor 161, a root directory, and a file entry 162 for managing the root directory into a data memory 221. The system control unit 201 instructs the optical disk drive device 205 to record the produced file structure into the data memory 221.

The optical disk drive device 205 records the file structure, which is transferred from the data memory 221, into a file structure area 120. When the file structure is completely recorded, the optical disk drive device 205 notices the recording completion to the system control unit 201.

(S403) The system control unit 201 produces a VAT 163 and a VATICB 164 in a data memory 221 in accordance with a control program incorporated with the advanced VAT structure recording unit 271.

Further, the system control unit 201 instructs the optical disk drive device 205 to record the advanced VAT structure produced in the data memory 221.

The optical disk drive device 205 records the advanced VAT structure, which is transferred from the data memory 221, into the advanced VAT structure area 122. When the advanced VAT structure is completely recorded, the optical disk drive device 205 notices the recording completion to the system control unit 201.

Note that in the case of a DVD-R disk, every time data recording is stopped, a linking area having a predetermined amount of dummy data may be provided before and after a data recording unit. For the sake of simplicity, the description of data structure and data recording is omitted.

FIG. 5 is a diagram showing a data structure of an information recording medium after being formatted. When a "unrecorded" information recording medium is subjected to the above-described formatting process, the information recording medium obtains the data structure of FIG. 5.

4. File Recording Process

Figure 6:
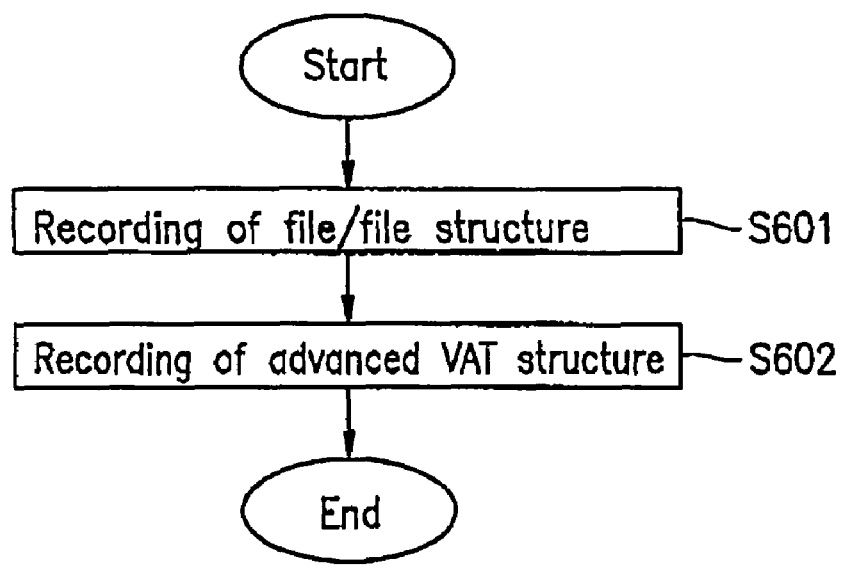
FIG. 6 is a flowchart showing a procedure of a file recording process.

FIG. 6 is a diagram showing the procedure of a file recording process. Hereinafter, the file recording process procedure will be described on a step-by-step basis.

Figure 14:
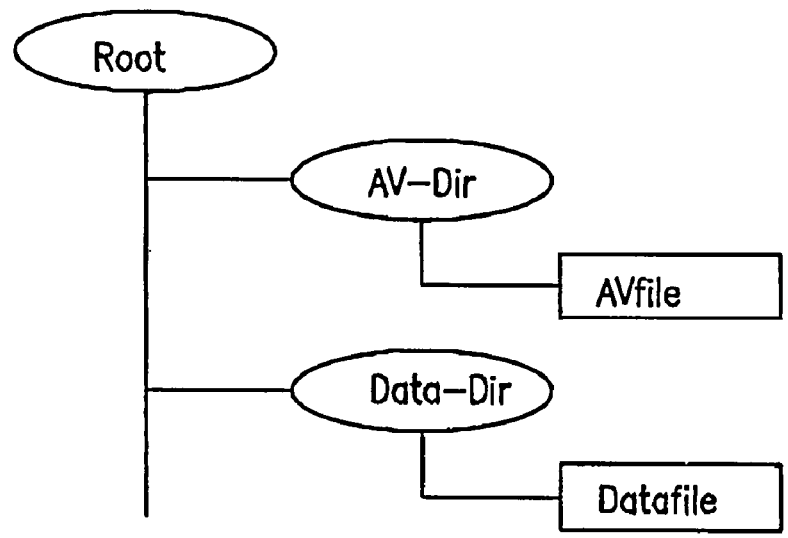
FIG. 14 is a diagram showing a directory structure in which files recorded in a disk are managed.
Figure 15:
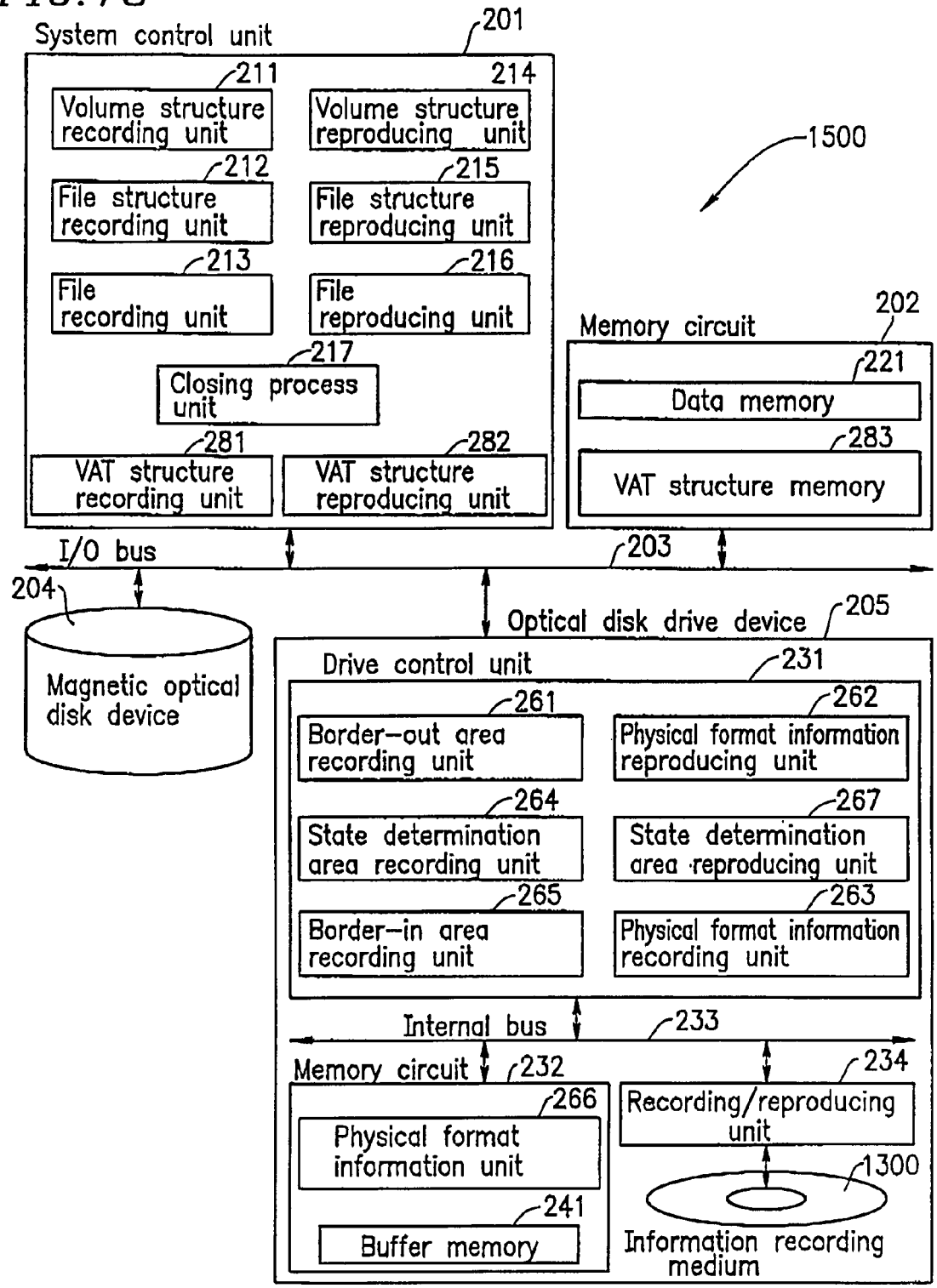
FIG. 15 is a diagram showing a structure of a conventional information recording/reproducing apparatus.
Figure 16:
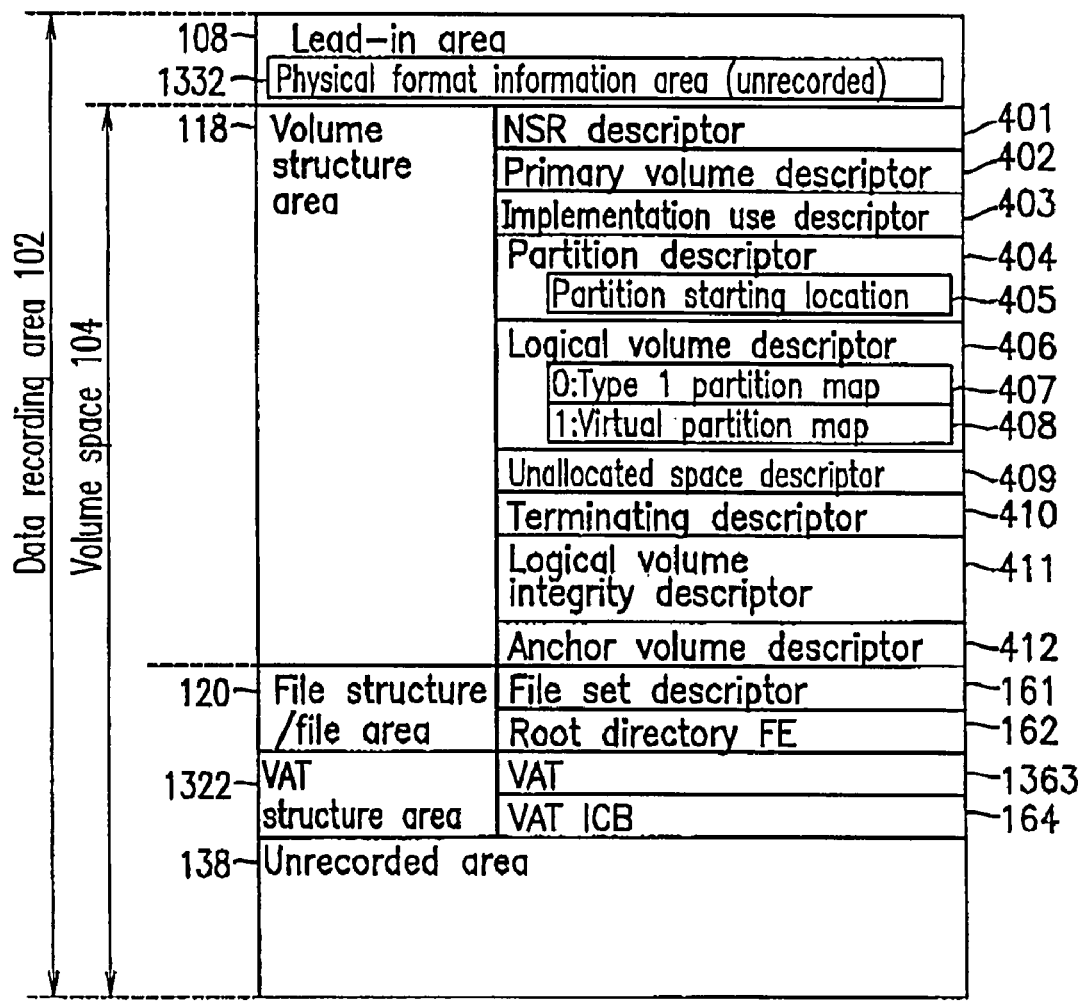
FIG. 16 is a diagram showing a data structure diagram of an information recording medium after being subjected to a conventional formatting process.
Figure 17:
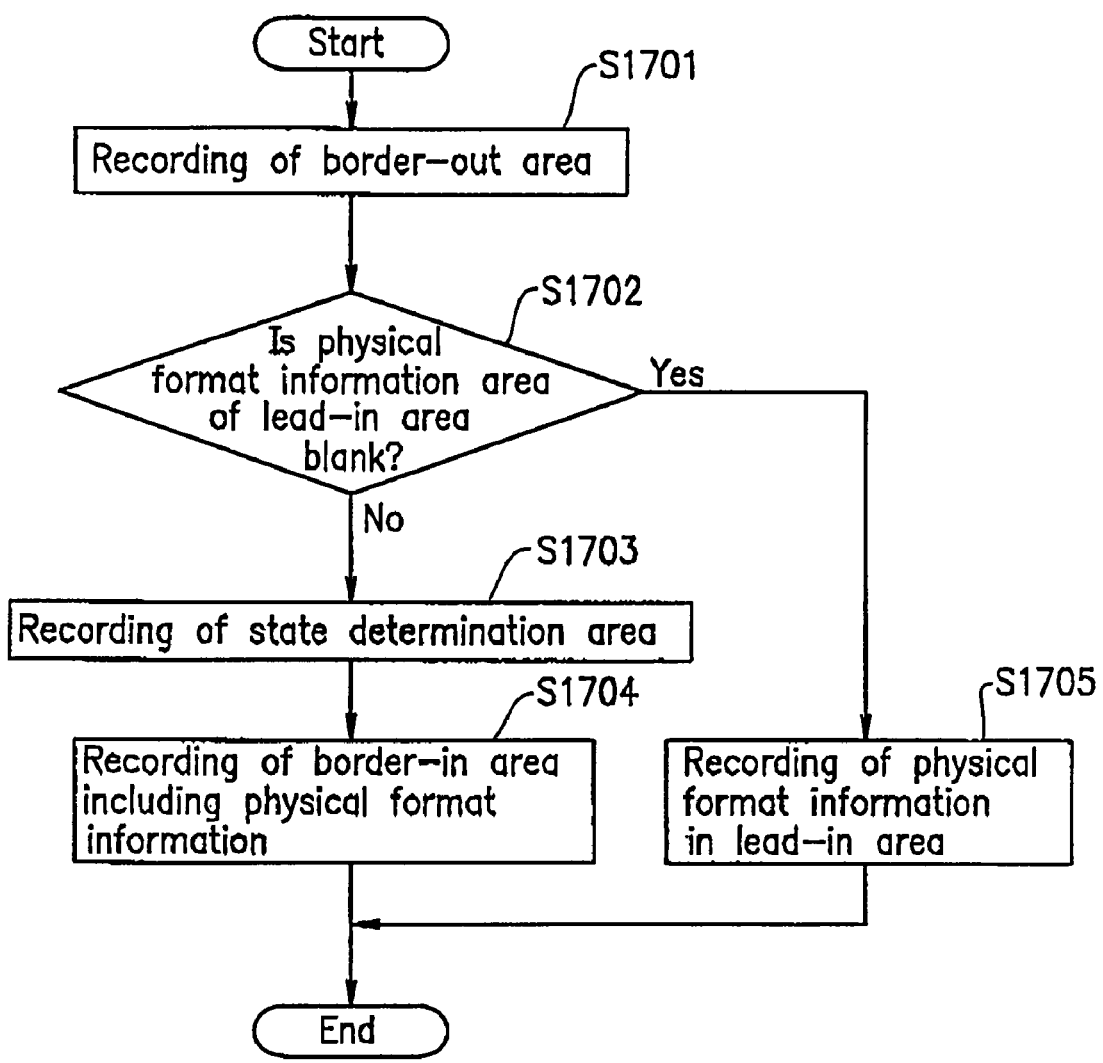
FIG. 17 is a flowchart showing a procedure of a conventional closing process.
Figure 18:
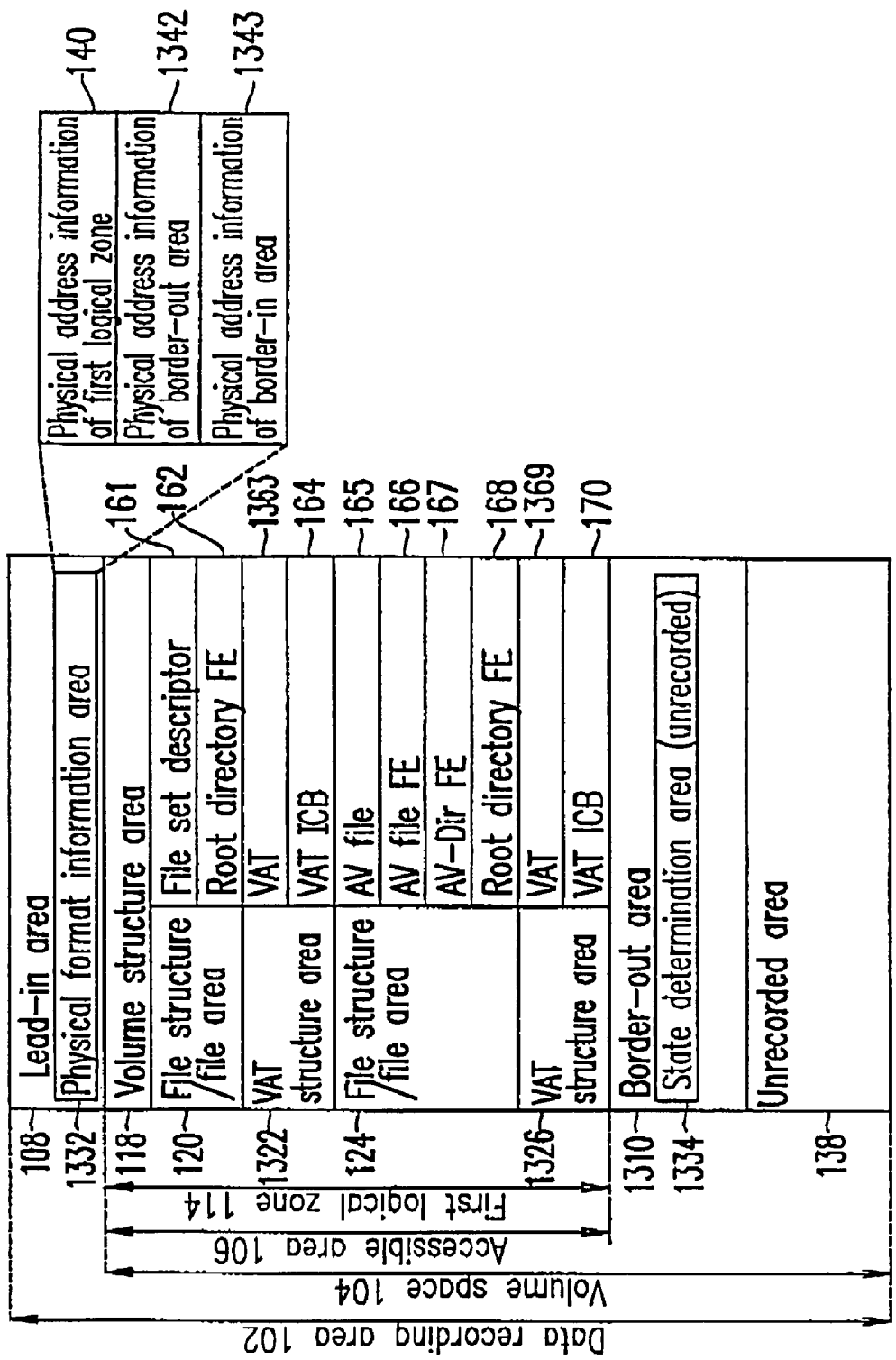
FIG. 18 is a diagram showing a data structure of an information recording medium after being subjected to a conventional closing process.

Note that it is assumed that in the file recording process, an AVfile stored in the magnetic disk device 204 is recorded in accordance with the directory structure of FIG. 14.

(S601) The system control unit 201 reads out an AVfile from the magnetic disk device 204 and transfers the AVfile to the data memory 221 of the memory circuit 202, in accordance with a control program incorporated with the file recording unit 213.

Next, the system control unit 201 produces an AVfile 165 and a directory file (AV-Dir), an AVfile entry FE (file entry) 166 for managing these files, a directory file (AV-Dir) FE (file entry) 167, and a root directory file entry 168 in which the content of a root directory is updated.

When a directory file and a file entry in association with an AVfile each are stored in the data memory 221, the system control unit 201 instructs the optical disk drive device 205 to record these data, in accordance with the control programs incorporated with the file structure recording unit 212 and the file recording unit 213.

The optical disk drive device 205 records a file entry and a directory file, which are transferred from the data memory 221, and a file structure/file including an AVfile into a file structure/file area 124. Note that for the sake of simplicity, it is assumed that these directory file file entries include a directory file itself having a relatively small size. When the recording into the file structure/file area 124 is completed, the optical disk drive device 205 notices the recording completion to the system control unit 201.

Note that a directory file (AV-Dir) is embedded and recorded in the file entry 167 for managing the directory. Therefore, the directory file itself is not shown.

(S602) The system control unit 201 updates the advanced VAT 169 and the VATICB 170 in the data memory 221 in accordance with the control program incorporated with the advanced VAT structure recording unit 271.

Further, the system control unit 201 instructs the optical disk drive device 205 to record the advanced VAT structure produced in the data memory 221. The optical disk drive device 205 records the advanced VAT structure, which is transferred from the data memory 221, into the advanced VAT structure area 126. When the advanced VAT structure is completely recorded, the optical disk drive device 205 notices the recording completion to the system control unit 201.

5. Closing Process

Figure 7:
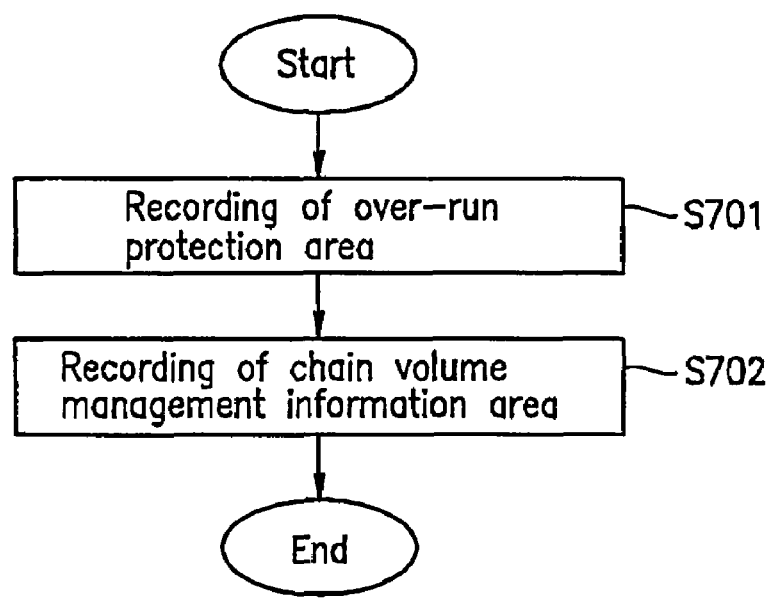
FIG. 7 is a flowchart showing a procedure of a closing process.

FIG. 7 is a diagram showing the procedure of a closing process. Hereinafter, the closing process procedure will be described on a step-by-step basis.

(S701) The system control unit 201 instructs the optical disk drive device 205 to execute the closing process in accordance with a control program incorporated with the closing process unit 217.

The drive control unit 231 of the optical disk drive device 205 allocates an over-run protection area in the volume space 104 and records dummy data in the over-run protection area in accordance with a control program incorporated with the over-run protection recording unit 252.

In this manner, a logical zone for recording at least a volume file structure is provided between the lead-in area 108 (or an over-run protection area) and an over-run protection area.

(S702) The drive control unit 231 produces chain volume management information and records the produced chain volume management information into a chain volume management information area included in an over-run protection area in accordance with a control program incorporated with the chain volume management information recording unit 251.

The chain volume management information produced in this recording operation includes the address information of a subsequent logical zone and the address information of an unrecorded chain volume management information area which is provided in an over-run protection area newly recorded by the closing process.

Figure 8:
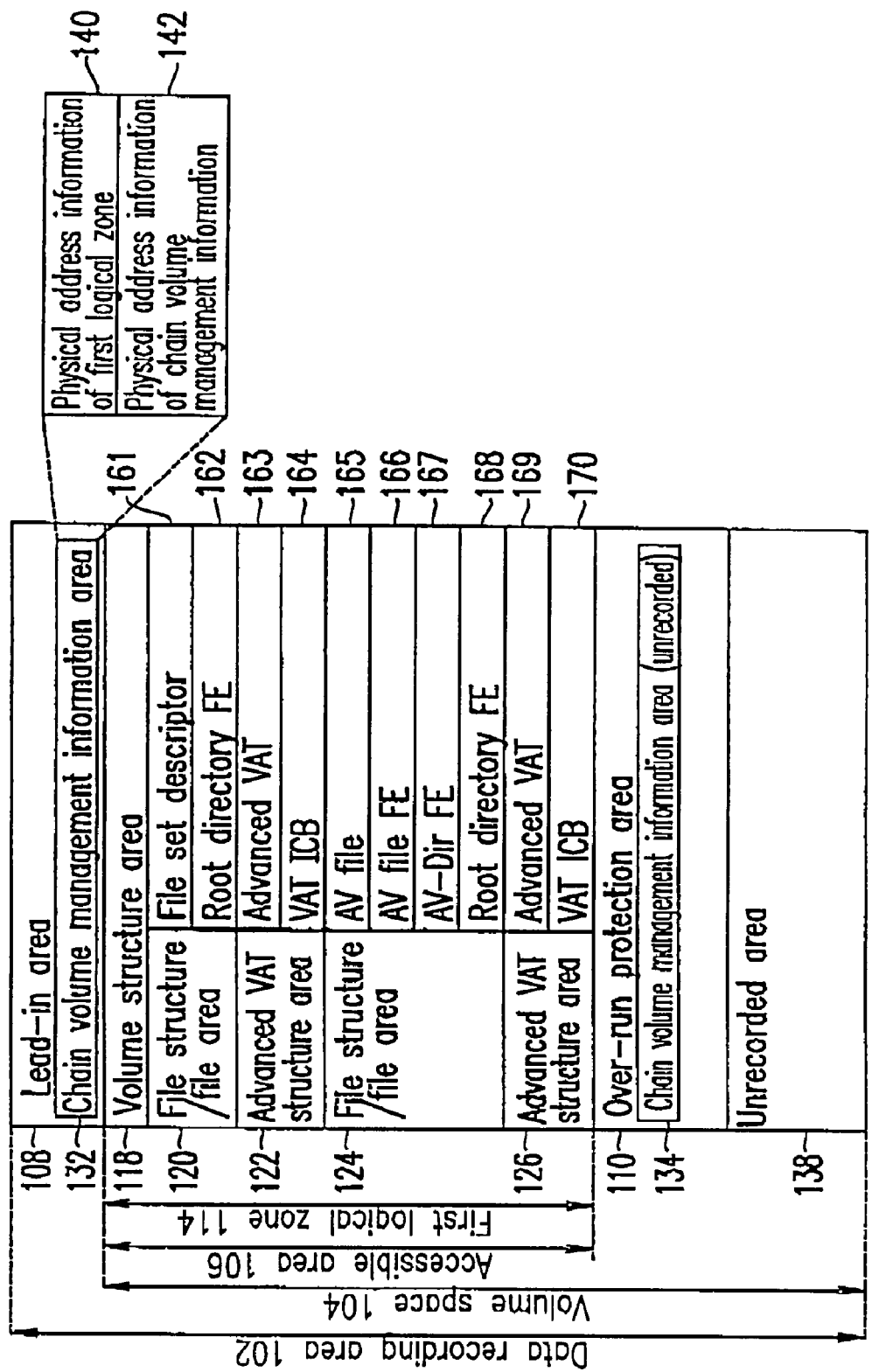
FIG. 8 is a diagram showing a data structure of an information recording medium after being subjected to the closing process.

FIG. 8 is a diagram showing a data structure of an information recording medium after being subjected to the closing process.

When an information recording medium having the data structure of FIG. 5 is subjected to the AVfile recording and closing processes, the information recording medium obtains the data structure of FIG. 8.

Dummy data is recorded in the over-run protection area 110 excluding the chain volume management information area 134 (in the case of the data structure of FIG. 8) or in the over-run protection area 112 excluding the chain volume management information area 136 (in the case of the data structure of FIG. 1). For example, the dummy data is 00h.

The chain volume management information is recorded in the chain volume management information area 132 (in the case of the data structure of FIG. 8), or in the chain volume management information area 134 (in the case of the data structure of FIG. 1).

Further, the information recording medium 100 having the data structure of FIG. 8 is subjected to the data file recording and closing processes, thereby obtaining the information recording medium 100 having the data structure of FIG. 1.

When recording an additional file into the information recording medium 100 is prohibited, a lead-out area is recorded in the unrecorded area 138.

Figure 9:
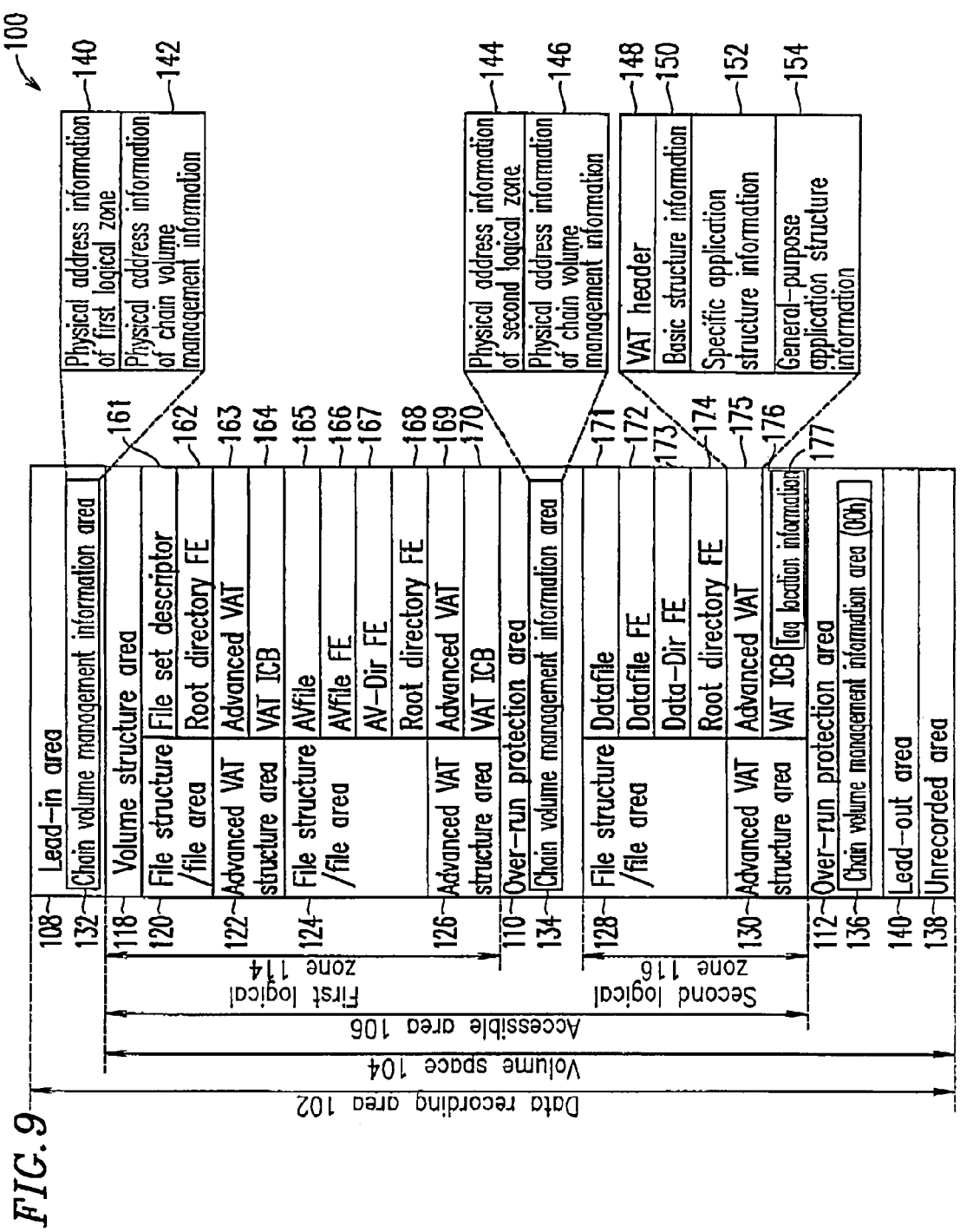
FIG. 9 is a diagram showing the case when a lead-out area is recorded in an unrecorded area.

FIG. 9 is a diagram showing the case when the lead-out area is recorded in the unrecorded area 138 having the data structure of FIG. 1.

The system control unit 201 instructs the optical disk drive device 205 to execute a lead-out process in accordance with a control program incorporated with the lead-out process unit 218.

The drive control unit 231 of the optical disk drive device 205 allocates a lead-out area 140, in which dummy data is recorded, in a data recording area 102 in accordance with a control program incorporated with the lead-out area recording unit 255. Further, the drive control unit 231 records dummy data into the unrecorded chain volume management information area 136 in order to indicate that no new subsequent chain volume management information area exists, in accordance with the control program incorporated with the lead-out area recording unit 255. For example, the dummy data is 00h.

6. File Reproducing Process

Figure 10:
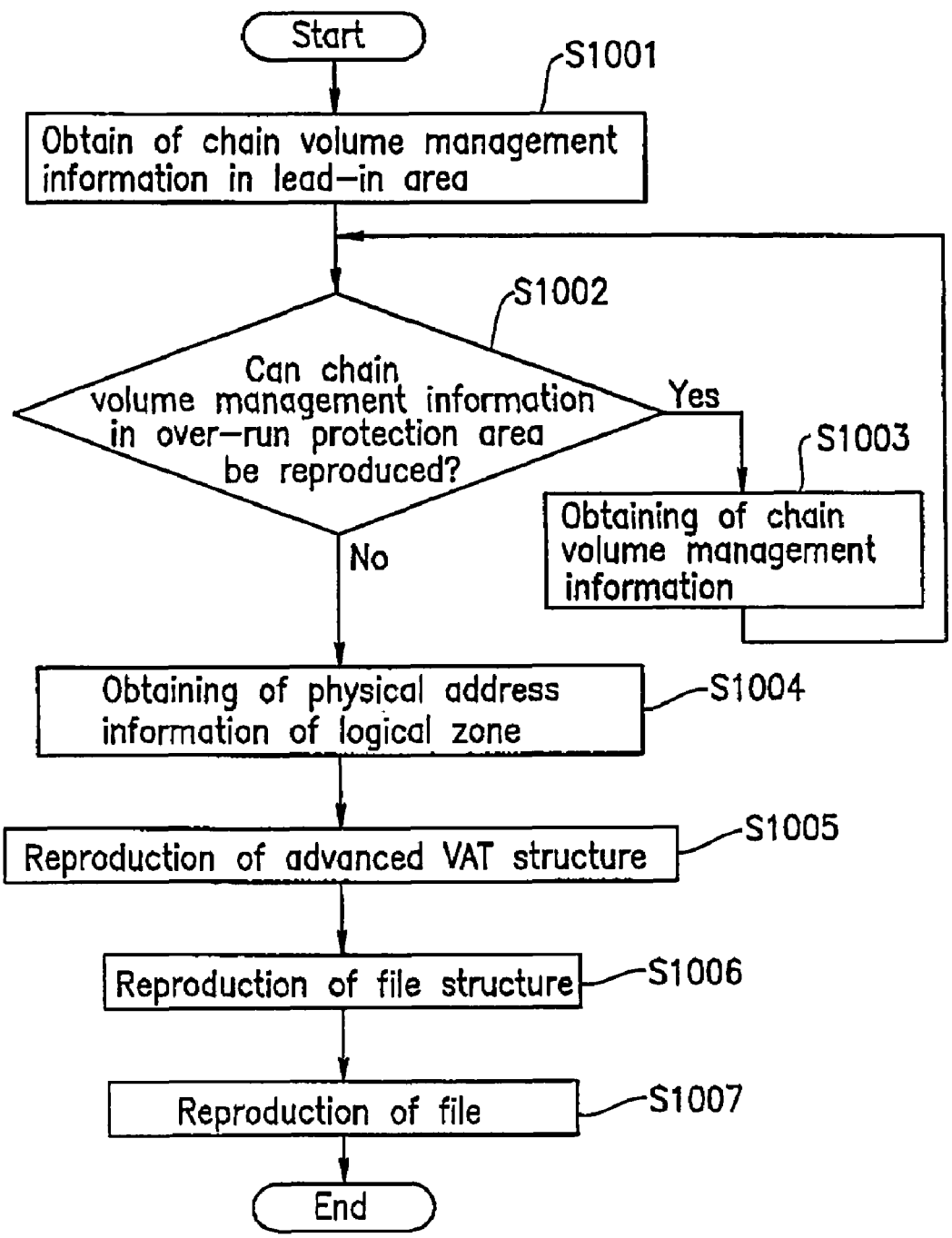
FIG. 10 is a flowchart showing a procedure of a file reproducing process.

FIG. 10 is a diagram showing the procedure of a file reproducing process. Hereinafter, the file reproducing process procedure will be described on a step-by-step basis. Note that the AVfile of FIG. 14 is used as an example to explain the file reproducing process.

(S1001) When the drive control unit 231 detects that a disk is loaded into the optical disk drive device 205, the drive control unit 231 actuates the recording/reproducing unit 234 and reproduces chain volume management information from the chain volume management information area 132 of the lead-in area 108, in accordance with a control program incorporated with the chain volume management information reproducing unit 254. The reproduced chain volume management information is then transferred from the chain volume management information area 132 to the chain volume management information memory 253.

(S1002) The drive control unit 231 tries to reproduce a chain volume management information area, based on the address information 142 of the chain volume management information area 134 included in the chain volume management information obtained in step S1001, in accordance with a control program incorporated with the chain volume management information reproducing unit 254.

In FIG. 1, the address information 142 of a chain volume management information area recorded in the chain volume management information area 132 includes the position information of the chain volume management information area 134. The address information 146 of a chain volume management information area recorded in the chain volume management information area 134 includes the position information of the chain volume management information area 136.

If the chain volume management information area designated by such a reproducing operation is not unrecorded and a chain volume management information can be reproduced from the chain volume management information area, step S1003 and thereafter are executed. If the chain volume management information area designated by such a reproducing operation is unrecorded and a chain volume management information cannot be reproduced from the chain volume management information area, step S1004 and thereafter are executed.

(S1003) The drive control unit 231 transfers, the chain volume management information reproduced in step S1002 to the chain volume management information memory 253 in accordance with a control program incorporated with the chain volume management information reproducing unit 254.

(S1004) The drive control unit 231 obtains the physical address of the end of an accessible area from the address information of a logical zone, by referring to the latest chain volume management information, in accordance with the control program incorporated with the chain volume management information reproducing unit 254.

In FIG. 1, the physical address of the end of an accessible area is obtained based on the address information 144 of the second logical zone 116 recorded in the chain volume management information area 134.

(S1005) The system control unit 201 obtains the address information 144 of the second logical zone 116 recorded in the chain volume management information memory 253 of the optical disk drive device 205, as the physical address of the end of an accessible area, in accordance with a control program incorporated with the advanced VAT structure reproducing unit 272.

Next, the system control unit 201 instructs the optical disk drive device 205 to reproduce the VATICB 176 recorded at the end of the accessible area using the physical address. The optical disk drive device 205 reads out and transfers the VATICB 176 to the advanced VAT structure memory 273. Note that the system control unit 201 can recognize that a VAT structure is recorded, without reading out a volume structure, since a VATICB is recorded at the end of an accessible area.

The system control unit 201 obtains logical addresses indicating recording positions of VATICB 176 from the read-out tag location information 177. The system control unit 201 also converts the physical address of the end of a previously obtained accessible area into a logical sector number. A logical sector number corresponding to a partition starting location to which a logical address 0 is assigned is calculated by subtracting a logical address read out from tag location information from the logical sector number of the end of the accessible area. Therefore, it is not necessary to obtain a partition starting location from a volume structure.

Further, the system control unit 201 interprets the is address information of the advanced VAT 175 included in the read out VATICB 176, and reads out and stores the advanced VAT 175 into the advanced VAT structure 273. Note that when an advanced VAT is recorded using a plurality of sectors, only a head sector required for reproduction of an AVfile is read out.

(S1006) The system control unit 201 reads out the physical addresses of file set descriptors registered from the advanced VAT 175 to VAT entry 0 obtained in step S1005, in accordance with the control program stored in the file structure reproducing section 215, and reads out the file set descriptor 161 using a partition reference number and a logical block address included in the logical address, in accordance with the control program incorporated with the file structure reproducing unit 215. Similar to the case of a file set descriptor, the system control unit 201 reads out the root directory FE 174 registered in VAT entry 1 and searches the management information of a directory (AV-Dir) from a root directory recorded as a part of the root directory FE 174 while converting a virtual address into a logical address.

Next, the system control unit 201 reads out the directory (AV-Dir) FE 167 registered in VAT entry 2 and searches the management information of an AVfile from the directory (AV-Dir) recorded as a part of the directory (AV-Dir) FE 167. Further, the system control unit 201 reads out the directory (AVfile) FE 166 registered in VAT entry 17 and obtains the recording position of a target AVfile.

(S1007) Finally, the system control unit 201 reads out the file (AVfile) 165 and completes file reproduction, in accordance with a control program incorporated with the file reproducing unit 216.

In accordance with the above-described procedure, the information recording/reproducing device 300 searches and reproduces an AVfile at a high speed while preventing access to an unrecorded area. Note that in step S1006, the management information of a directory (AV-Dir) is searched using a file set descriptor and a root directory, and thereafter an AVfile file entry is read out and a target AVfile is read out.

However, if a specific virtual address is assigned to a directory (AV-Dir) file entry or AVfile file entry similar to a file set descriptor or root directory, it is possible to directly search the directory (AV-Dir) file entry without accessing the file set descriptor and the root directory. Thereby, an AVfile can be searched and reproduced at a higher speed.

In the information recording medium of the present invention, the address information of a subsequent logical zone and the address information of a chain volume management information area assigned in an over-run protection area are recorded in a lead-in area and the over-run protection area.

Figure 19:
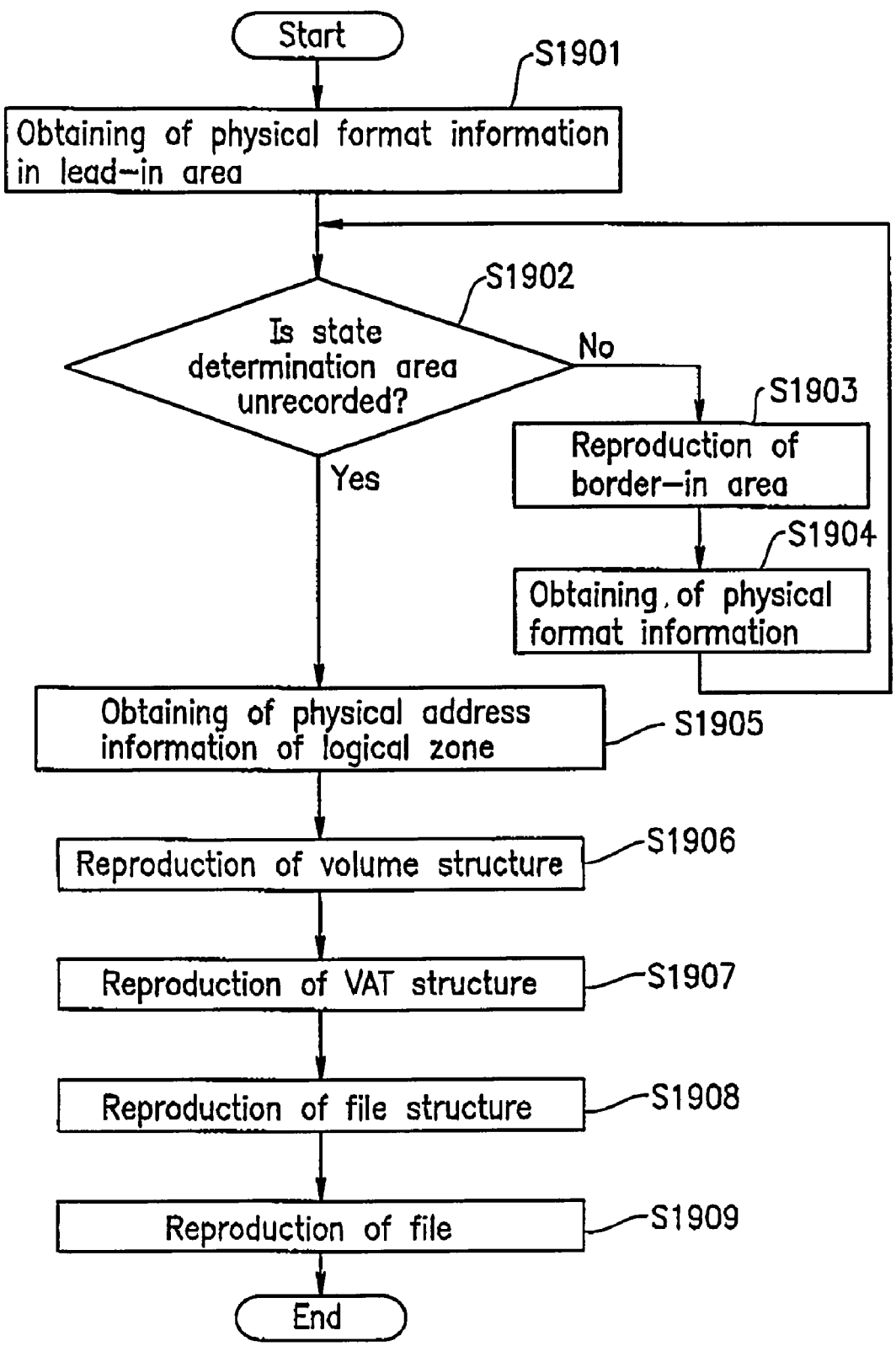
FIG. 19 is a flowchart showing a procedure of a conventional file reproducing process.

The information recording/reproducing apparatus of the present invention using such an information recording medium can search the physical address of the end of an accessible area while preventing access to an unrecorded area by sequentially accessing only chain volume management information areas in a lead-in area and an over-run protection area. As described with reference to FIG. 19, the access frequency is reduced substantially by half and the processing time is significantly reduced, as compared with a conventional information recording/reproducing apparatus in which the physical address of the end of an accessible area is searched by accessing alternately a physical format information area and a state determination area.

In the information recording medium of the present invention, an advanced VAT, in which a specific virtual address is assigned to a file set descriptor or a root directory file entry as basic structure information, is recorded in an advanced VAT structure area.

The information recording/reproducing apparatus of the present invention using such an information recording medium, when executing file reproduction, can directly search a file set descriptor and a root directory file entry to which specific virtual addresses are assigned, without searching a volume structure. Thereby, the access time is reduced.

Further, in the information recording medium of the present invention, an advanced VAT, in which a specific virtual address is assigned to a directory (AV-Dir) file entry or an AVfile file entry as a specific application structure information, is recorded in an advanced VAT structure area.

The information recording/reproducing apparatus of the present invention using such an information recording medium, when reproducing an AVfile, can search directly a directory (AV-Dir) file entry or an AVfile file entry to which specific virtual addresses are assigned, without searching a basic structure information such as a file set descriptor and a root directory file entry. Thereby, the access time is further reduced. When such an AVfile is reproduced, only a VAT entry recorded at the head sector of an advanced VAT is used, thereby making it possible to read out an AVfile at a high speed in accordance with a simple procedure even when a household AV apparatus having a limited capacity memory and a relatively low performance processor is used.

In the above-described example, an information recording medium in which chain volume management information is recorded in a lead-in area and an over-run protection area is explained. A method and an apparatus for recording information into such an information recording medium, and a method and an apparatus for reproducing information recorded in the information recording device are explained.

Note that, an information recording medium, in which chain volume management information is recorded in a lead-in area and an over-run protection area and in which an advanced VAT in which specific virtual addresses are assigned to a file set descriptor and a root directory file entry as basic structure information is not recorded in an advanced VAT structure area, is also present in the scope of the present invention. A method and an apparatus for recording information into such an information recording medium, and a method and an apparatus for reproducing information recorded in the information recording medium are also present in the scope of the present invention. In this case, sequential access to chain volume management information areas in a lead-in area and an over-run protection area makes it possible to search the physical address of the end of an accessible area while preventing access to an unrecorded area. Thereby, the access frequency is reduced substantially by half and the processing time is significantly reduced.

Figure 11:
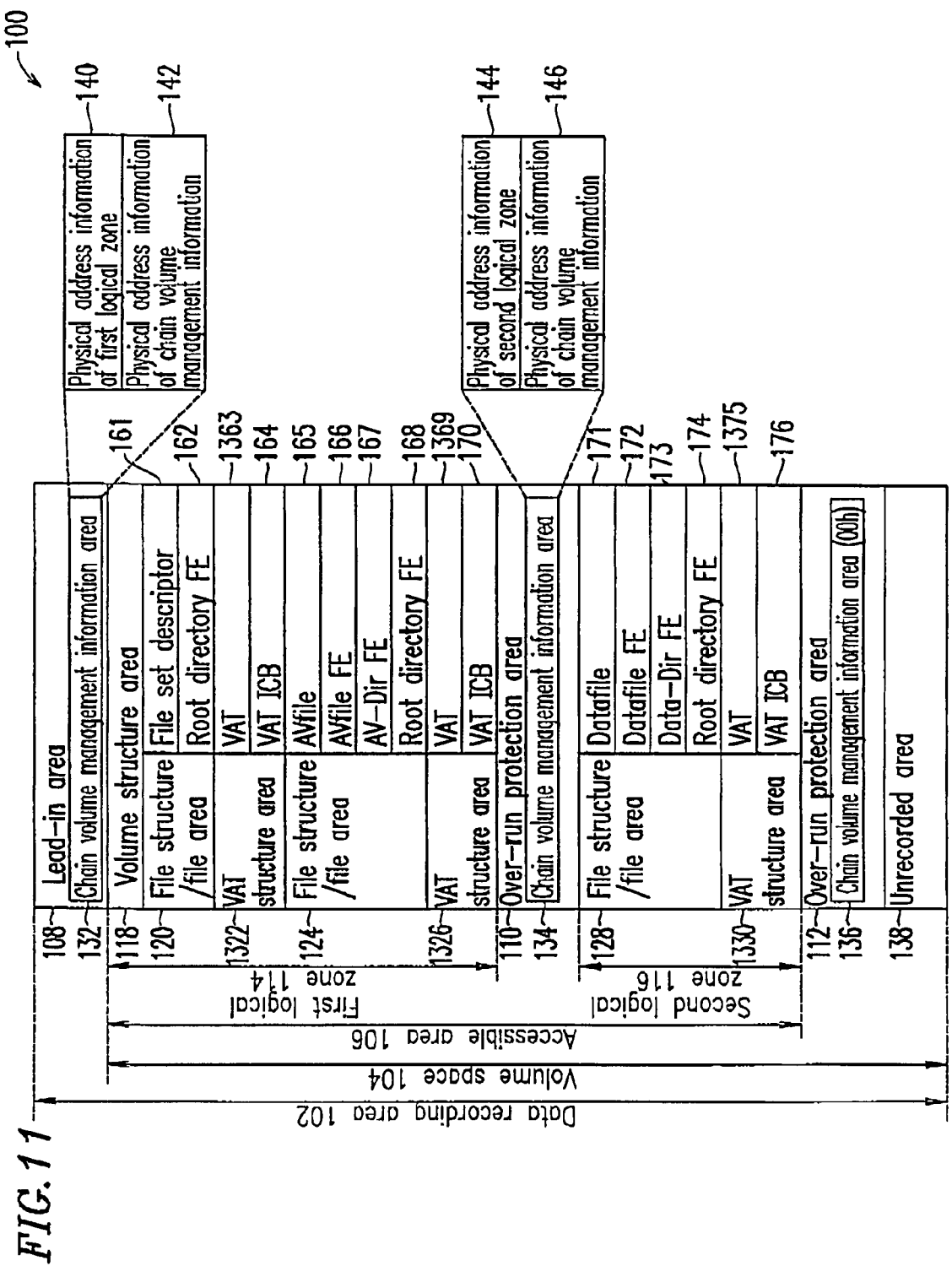
FIG. 11 is a diagram showing a data structure of an information recording medium according to another example of the present invention.

FIG. 11 is a diagram showing an information recording medium in which chain volume management information is recorded in a lead-in area and an over-run protection area and in which an advanced VAT in which specific virtual addresses are assigned to a file set descriptor and a root directory file entry as basic structure information is not recorded in an advanced VAT structure area.

Note that in the chain volume management information area 132 of the information recording medium of FIG. 11, the physical address information 1202 of a border-in area as well as the physical address information 140 of a first logical zone and the physical address information 142 of a chain volume management information area are recorded. Further, a border-in area 1204 may be provided following an over-run protection area 110 as shown in FIG. 11.

Figure 12:
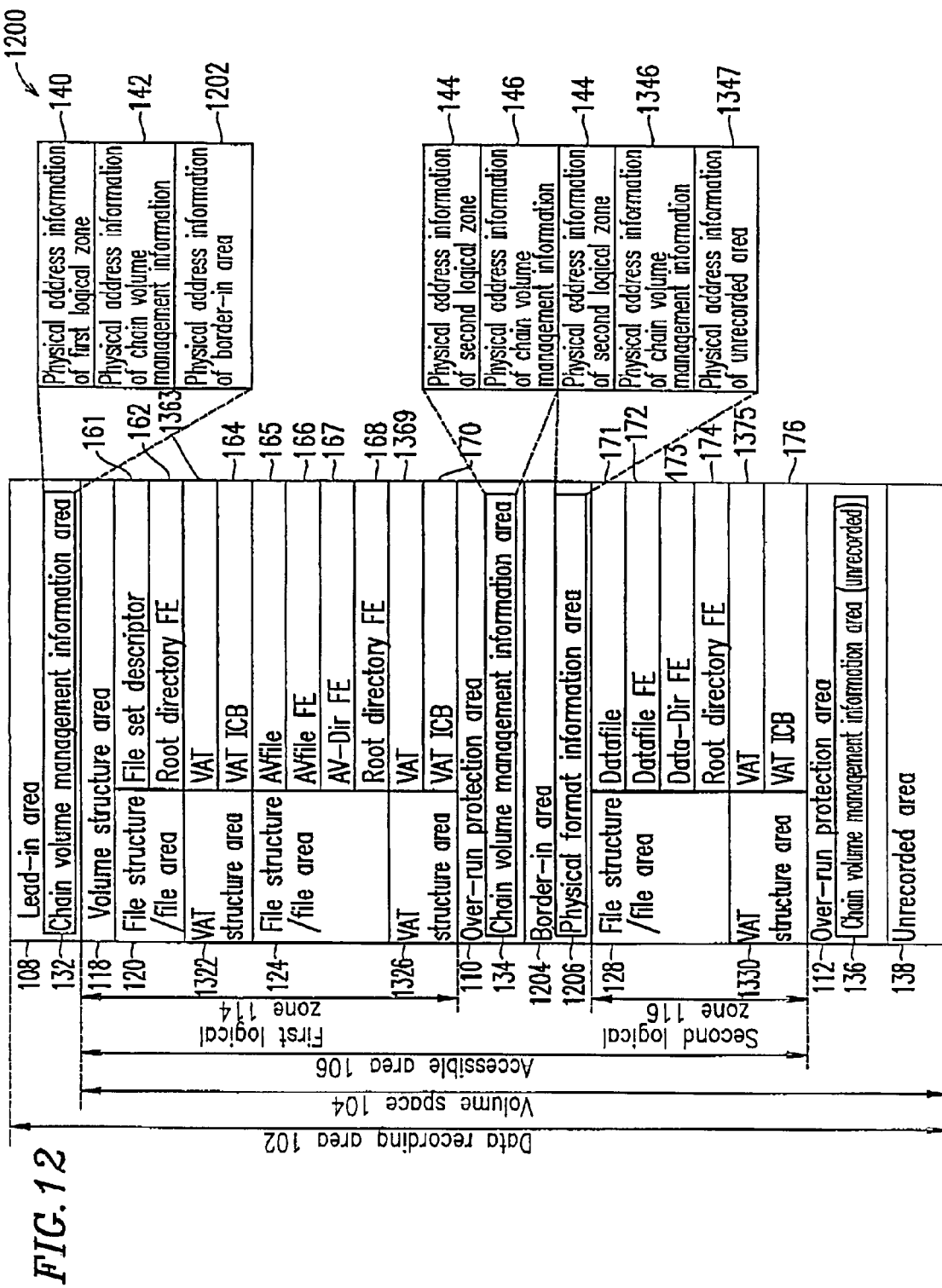
FIG. 12 is a diagram showing a data structure of an information recording medium according to still another example of the present invention.
Figure 13:
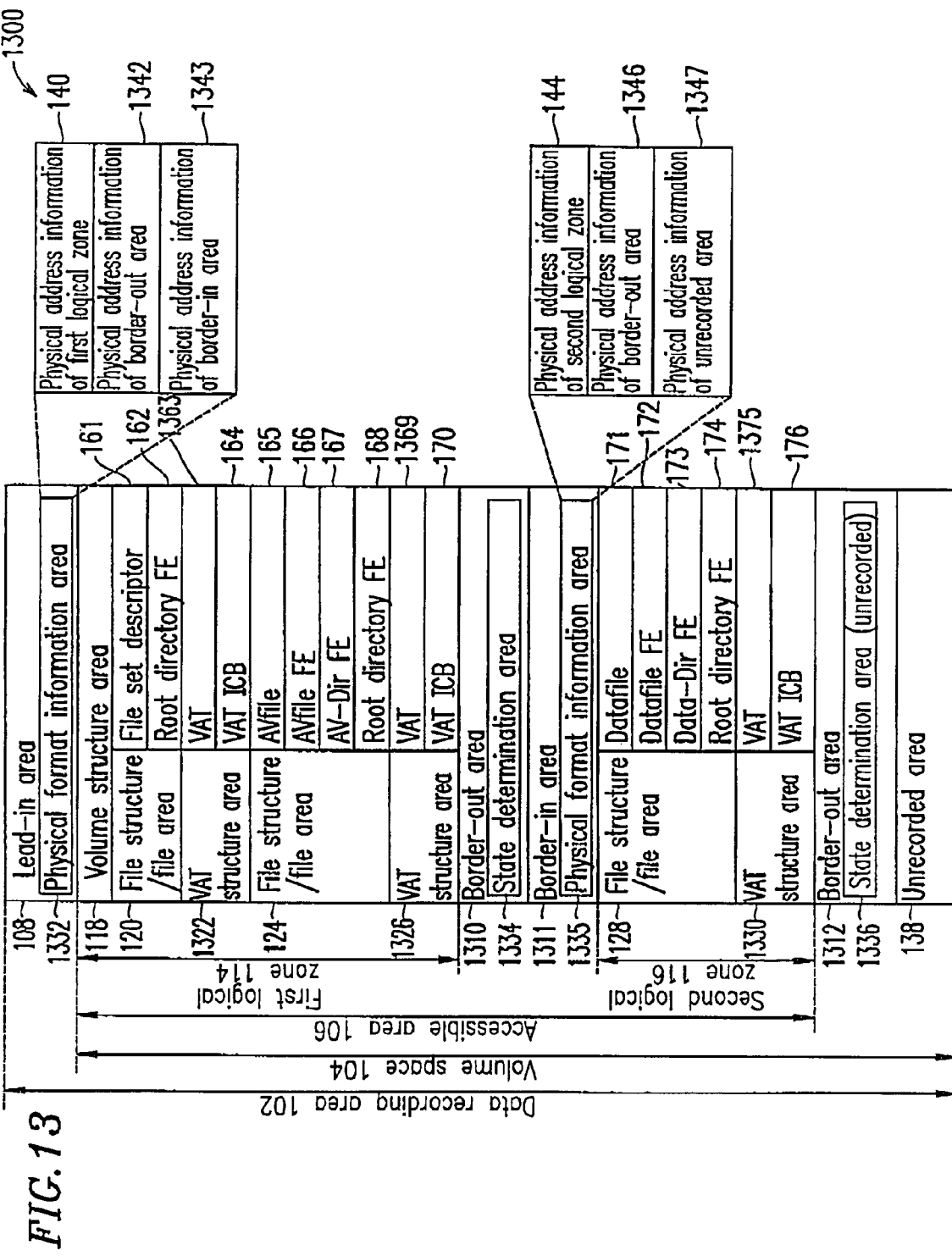
FIG. 13 is a diagram showing a data structure of a conventional information recording medium.

The border-in area 1204 includes a physical format information area 1206. In the physical format information area 1206, the physical address information 144 of a second logical zone, the physical address information 1346 of a chain volume management information area, and the physical address information 1347 of an unrecorded area 138 are is recorded. FIG. 12 is a diagram showing an information recording medium 1200 having such a data structure.

As described above, the information recording medium 1200 can be reproduced using the conventional information recording/reproducing apparatus 1500.

Note that, an information recording medium, in which an advanced VAT in which specific virtual addresses are assigned to a file set descriptor and a root directory file entry as basic structure information is recorded in an advanced VAT structure area and in which a chain volume management information is not recorded in a lead-in area and an over-run protection area, is also present in the scope of the present invention. A method and an apparatus for recording information into such an information recording medium, and a method and an apparatus for reproducing information recorded in the information recording medium are also present in the scope of the present invention. In this case, when a file is reproduced, it is possible to search directly a file set descriptor and a root directory file entry to which specific virtual addresses are assigned without searching no volume structure. Thereby, the access time is reduced.

An information recording medium according to the present invention includes chain volume management information areas allocated in a lead-in area and each over-run protection area. In each chain volume management information area, the address information of a subsequent logical zone and the address information of the chain volume management information area allocated in an over-run protection area immediately following the logical zone are recorded.

An information reproducing apparatus according to the present invention using such an information recording medium sequentially accesses only chain volume management information areas in a lead-in area and a subsequent over-run protection area, thereby making it possible to search the physical address of the end of an accessible area while preventing access to an unrecorded area. As described with reference to FIG. 19, the access frequency is reduced substantially by half and the processing time is significantly reduced, as compared with a conventional information recording/reproducing apparatus in which the physical address of the end of an accessible area is searched by accessing alternately a physical format information area and a state determination area.

Further, in the information recording medium of the present invention, an advanced VAT in which specific virtual addresses are assigned to a file set descriptor and a root directory file entry as basic structure information is recorded in an advanced VAT structure area.

The information recording/reproducing apparatus of the present invention using such an information recording medium, when executing file reproduction, can search directly a file set descriptor and a root directory file entry to which specific virtual addresses are assigned, without searching a volume structure. Thereby, the access time is reduced.

Furthermore, in the information recording medium of the present invention, an advanced VAT, in which a specific virtual address is assigned to a directory (AV-Dir) file entry or an AVfile file entry, is recorded in an advanced VAT structure area.

The information recording/reproducing apparatus of the present invention using such an information recording medium, when reproducing an AVfile, can search directly a directory (AV-Dir) file entry or an AVfile file entry to which specific virtual addresses are assigned, without searching no basic structure information such as a file set descriptor and a root directory file entry. Thereby, the access time is further reduced. When such an AVfile is reproduced, only a VAT entry recorded at the head sector of an advanced VAT is used, thereby making it possible to read out an AVfile at a high speed in accordance with a simple procedure even when a household AV apparatus having a limited capacity memory and a relatively low performance processor is used.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed:

1. An information recording medium comprising a data recording area, wherein:
   a lead-in area and a volume space are allocated in the data recording area in advance;
   an advanced VAT structure area is allocated in the volume space;
   an advanced VAT for managing a correspondence between a virtual address indicating an address in a virtual address space and a logical address indicating an address in a logical address space is recorded in the advanced VAT structure area;
   basic structure information indicating a file structure is assigned at a specific virtual address in the advanced VAT, the basic structure information being indispensable for searching all files recorded in the information recording medium;
   specific application structure information indicating a file structure is assigned in a specific virtual address range in the advanced VAT, the specific application structure information being indispensable for searching an AVfile recorded in the information recording medium; and
   the basic structure information and the specific application structure information are arranged within one sector from a head of the advanced VAT.

2. An information recording medium according to claim 1, wherein the advanced VAT structure area is arranged at an end of an accessible area.

3. An information recording method for recording information in an information recording medium comprising a data recording area, wherein:
   a lead-in area and a volume space are allocated in the data recording area in advance; and
   the information recording method comprises the step of:
      allocating an advanced VAT structure area in the volume space; and
      recording an advanced VAT for managing a correspondence between a virtual address indicating an address in a virtual address space and a logical address indicating an address in a logical address space in the advanced VAT structure area; basic structure information indicating a file structure is assigned at a specific virtual address in the advanced VAT, the basic structure information being indispensable for searching all files recorded in the information recording medium;
   specific application structure information indicating a file structure is assigned in a specific virtual address range in the advanced VAT, the specific application structure information being indispensable for searching an AVfile recorded in the information recording medium; and
   the basic structure information and the specific application structure information are arranged within one sector from a head of the advanced VAT.

4. An information recording device for recording information in an information recording medium comprising a data recording area, wherein:
   a lead-in area and a volume space are allocated in the data recording area in advance; and
   the information recording device comprises:
      a section for allocating an advanced VAT structure area in the volume space; and
      a section for recording an advanced VAT for managing a correspondence between a virtual address indicating an address in a virtual address space and a logical address indicating an address in a logical address space in the advanced VAT structure area; basic structure information indicating a file structure is assigned at a specific virtual address in the advanced VAT, the basic structure information being indispensable for searching all files recorded in the information recording medium;
   specific application structure information indicating a file structure is assigned in a specific virtual address range in the advanced VAT, the specific application structure information being indispensable for searching an AVfile recorded in the information recording medium; and
   the basic structure information and the specific application structure information are arranged within one sector from a head of the advanced VAT.

5. An information reproducing method for reproducing information recorded in an information recording medium comprising a data recording area, wherein:
   a lead-in area and a volume space are allocated in the data recording area in advance, an advanced VAT structure area is allocated in the volume space, an advanced VAT information for managing a correspondence between a virtual address indicating an address in a virtual address space and a logical address indicating an address in a logical address space is recorded in the advanced VAT structure area, and basic structure information indicating a file structure is assigned at a specific virtual address in the advanced VAT, the basic structure information being indispensable for searching all files recorded in the information recording medium; specific application structure information indicating a file structure is assigned in a specific virtual address range in the advanced VAT, the specific application structure information being indispensable for searching an AVfile recorded in the information recording medium; and the basic structure information and the specific application structure information are arranged within one sector from a head of the advanced VAT; and the information reproducing method comprises the steps of:
- reading out information within one sector from a head of the advanced VAT recorded in the advanced VAT structure; and
- performing a reproduction operation based on the basic structure information and the specific application structure information included in the read out information.

6. An information reproducing device for reproducing information recorded in an information recording medium comprising a data recording area, wherein:

a lead-in area and a volume space are allocated in the data recording area in advance, an advanced VAT structure area is allocated in the volume space, an advanced VAT information for managing a correspondence between a virtual address indicating an address in a virtual address space and a logical address indicating an address in a logical address space is recorded in the advanced VAT structure area, and basic structure information indicating a file structure is assigned at a specific virtual address in the advanced VAT, the basic structure information being indispensable for searching all files recorded in the information recording medium; specific application structure information indicating a file structure is assigned in a specific virtual address range in the advanced VAT, the specific application structure information being indispensable for searching an AV file recorded in the information recording medium; and the basic structure information and the specific application structure information are arranged within one sector from a head of the advanced VAT; and the information reproducing device comprises:
- a section for reading out information within one sector from a head of the advanced VAT recorded in the advanced VAT structure; and
- a section for performing a reproduction operation based on the basic structure information and the specific application structure information included in the read out information.

* * * * *

UNITED STATES PATENT AND TRADEMARK OFFICE
CERTIFICATE OF CORRECTION

PATENT NO. : 7,437,390 B2 Page 1 of 1
APPLICATION NO. : 11/379636
DATED : October 14, 2008
INVENTOR(S) : Miyuki Sasaki, Yoshiho Goto and Yoshihisa Fukushima It is certified that error appears in the above-identified patent and that said Letters Patent is hereby corrected as shown below:

Title Page; item (56); page 2; col. 2; under OTHER PUBLICATIONS, "Sibling Application" should read -- Sibling Applications --.

Column 27, line 65, "step" should read -- steps --.

Signed and Sealed this

Seventh Day of April, 2009

JOHN DOLL
*Acting Director of the United States Patent and Trademark Office*